United States Patent
Nair et al.

(10) Patent No.: US 10,740,778 B1
(45) Date of Patent: Aug. 11, 2020

(54) PROVIDING PERSONALIZED PUZZLES TO USERS ACCESSING ELECTRONIC CONTENT

(71) Applicant: Amazon Technologies, Inc., Seattle, WA (US)

(72) Inventors: Naveen Sudhakaran Nair, Issaquah, WA (US); Pragyana K. Mishra, Seattle, WA (US); Chittaranjan Tripathy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 301 days.

(21) Appl. No.: 15/707,768

(22) Filed: Sep. 18, 2017

(51) Int. Cl.
*G06Q 30/02* (2012.01)
*G06Q 30/06* (2012.01)

(52) U.S. Cl.
CPC ..... *G06Q 30/0209* (2013.01); *G06Q 30/0222* (2013.01); *G06Q 30/0224* (2013.01); *G06Q 30/0631* (2013.01); *G06Q 30/0641* (2013.01)

(58) Field of Classification Search
None
See application file for complete search history.

(56) References Cited

U.S. PATENT DOCUMENTS

| | | | | |
|---|---|---|---|---|
| 2002/0143619 A1* | 10/2002 | Laurie | ..... | G06Q 30/02 705/14.12 |
| 2011/0264494 A1* | 10/2011 | Lechowicz | ..... | G06Q 30/02 705/14.12 |
| 2012/0215601 A1* | 8/2012 | McGuire | ..... | G06Q 30/06 705/14.13 |
| 2014/0025465 A1* | 1/2014 | Herring | ..... | G06Q 30/02 705/14.25 |
| 2015/0088624 A1* | 3/2015 | Frederick | ..... | G06Q 30/0209 705/14.12 |
| 2017/0132650 A1* | 5/2017 | McGuire | ..... | G06Q 30/06 |
| 2018/0137535 A1* | 5/2018 | Koenig | ..... | G06F 3/165 |

OTHER PUBLICATIONS

"Everything You Need to Know about Promotional Codes" (published online at https://www.easypromosapp.com/blog/en/2011/05/how-to-offer-coupons-in-facebook-with-easypromos/ on May 5, 2011) (Year: 2011).*

* cited by examiner

Primary Examiner — James M Detweiler
(74) Attorney, Agent, or Firm — Lee & Hayes, P.C.

(57) ABSTRACT

A content provider may cause a client device of a user to output a personalized puzzle in response to receiving a request from the client device to access electronic content of the content provider. The puzzle may include a theme that corresponds to a determined predilection of the user, and/or the puzzle may be a type of puzzle that corresponds to the user's predilection. The client device may also output, with the puzzle, an incentive for completing (e.g., solving) the puzzle Upon receiving data indicating that the user has completed his/her personalized puzzle, the content provider may provide the reward to the user.

20 Claims, 11 Drawing Sheets

Reviews

Customer Reviews for xxx (125 Reviews)

★★★☆☆ I like the fit, but...
By Jane P. Reviewer on August 23, 2017
When I tried mine on, they fit perfectly, but the color just wasn't quite how I expected it. The website makes it look really shiny, but they showed up with a dull finish.
▲ Comment | 2 people found this helpful. Was this review helpful to you? [Yes] [No] Report abuse

Puzzle Clue -- Here is a clue that may help you solve your current puzzle:
The shoes you are looking for are sold by a company who's name starts with the letter "L"

★★★★★ Best shoes ever
By Emily R. Rater on July 3, 2017
These are the best shoes I've ever purchased. They look sleek, they are perfect for weddings or other special occasions like that, or just for going out on the town. Super comfortable for heels too.
▲ Comment | 3 people found this helpful. Was this review helpful to you? [Yes] [No] Report abuse ★☆☆☆☆ Mine broke after two months
By April F. Critic on July 24, 2017
I loved these shoes, for a while, and then after about my tenth time wearing them, the heel snapped right off. I wouldn't recommend these.

FIG. 4

PROVIDING PERSONALIZED PUZZLES TO USERS ACCESSING ELECTRONIC CONTENT

BACKGROUND

As electronic devices become a greater part of daily life, the amount of electronic content distributed to users, and accessed, via electronic devices, continues to rise. For instance, users now regularly employ their mobile electronic devices (e.g., mobile phones, tablets, etc.) to access electronic content from anywhere network connectivity is present, and at any convenient time. However, as the content provider landscape becomes more competitive, individual content providers may struggle to keep users engaged with their own electronic content as often and as long as they would like to engage users.

Gamification of websites is a known strategy for driving user engagement with electronic content. However, existing gamification techniques are typically agnostic to the users that make up an online community. For instance, all users of an online community may be uniformly given the same games in hopes that some or all of the users will remain engaged with associated electronic content more often and for longer periods of time. In practice, this does not effectively engage a user community, as many users are disinterested in the gamification features employed by a website.

Furthermore, in today's content distribution environment, content providers are often unable to obtain accurate impression data with respect to their content when that content is distributed by third party entities that control the distribution channel(s) of the content. For example, a content provider that contracts with a third party entity to have its own content provided on the third party entity's social networking site has no way of knowing the number of times its content has been accessed or viewed by users of the social networking site. This is primarily due to the fact that the third party entities who own and/or control these types of distribution channels often do not readily share impression data with other entities who do not own or control the distribution channel(s) (in this case the social networking site). In fact, for some types of distribution channels, such as a television broadcast, it may be infeasible for the owner/operator of the broadcast media to obtain accurate impression data at the customer level.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 4 illustrates an example user interface (UI) served to a client device of an example user, such as a user with a predilection for shoes. In this example UI, the user is currently accessing customer reviews of an item that is available in an electronic marketplace. Embedded within the customer reviews is a clue that is designed to help the user complete an active shoe-themed puzzle provided to the user. The provisioning of the clue within the customer reviews may be based on a determination that the user views customer reviews at a frequency that meets or exceeds a threshold frequency.

DETAILED DESCRIPTION

Figure 1:
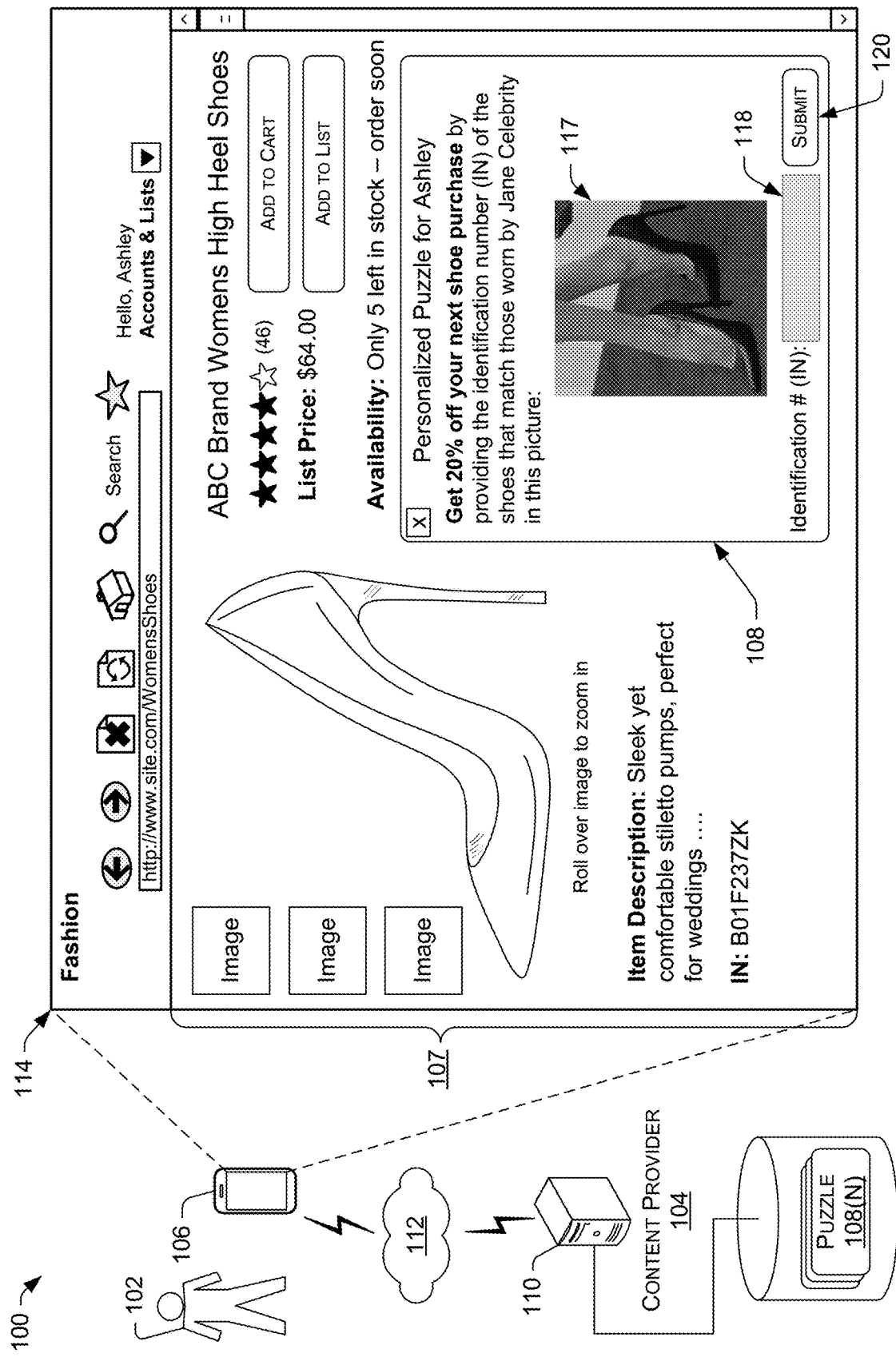
FIG. 1 illustrates an example environment in which a user may access electronic content served by a content provider, and in so doing, the user's client device may output a puzzle that is personalized to the user.

Disclosed herein are, among other things, techniques and systems for providing personalized puzzles to users who are accessing electronic content. For instance, a content provider may receive, over a computer network, a request from a client device of a user to access electronic content, and a computing device(s) of the content provider may respond by causing the client device to output a puzzle (sometimes referred to herein as a "puzzle-based game") for the requesting user to complete. The puzzle may include a theme that corresponds to a predilection of the user, and/or the puzzle may be a type of puzzle that corresponds to the user's predilection. For example, if the content provider determines that the user has a predilection for shoes, the content provider may select a shoe-based, or shoe-themed, puzzle to provision to the user. The predilection of the user may be determined from user data about the user that is accessible to the computing device(s) of the content provider, and the predilection may be used to select an appropriate puzzle that is personalized to the requesting user.

The puzzle may be output on the client device along with an incentive for completing (e.g., solving) the puzzle. Upon receiving data indicating that the user has completed his/her personalized puzzle, the computing device(s) of the content provider may provide a reward to the user. The incentive provided along with the puzzle may include an offer to provide the reward to the user (who requested the electronic content) in exchange for the user completing the puzzle. In this sense, the reward itself may act as the incentive for the user to remain engaged with the puzzle (and, thereby, to remain engaged with the electronic content) at least until successful completion of the puzzle, whereby additional puzzles may be thereafter provisioned to the user in an effort to sustain the user's engagement with the electronic content. Rewards may also serve as a form of goodwill from the content provider to reinforce customer loyalty to the content provider.

In some instances, the computing device(s) of the content provider may provision clues to users who are currently trying to complete puzzles. These clues may be designed to help the users complete their active puzzles, and may make the user-provider interaction more fun and enjoyable. In some implementations, the computing device(s) of the content provider may determine various different times and/or mechanisms (e.g., channels) to provision the clues to users, which may model a "treasure hunt" type of game play, taking users to find clues that are "hidden" within content distributed over various channels and at different times. In this manner, users with access to the distributed content may discover the clues and use the clues to complete their active puzzles.

By providing personalized puzzles to users who are accessing electronic content, existing gamification techniques are improved at least because users are challenged to complete puzzles that are not generic to a user population, but are specifically catered to their personal predilections. For instance, a user with a predilection for reading or literature may be provided a crossword puzzle or a limerick riddle, while a user with a predilection for mathematics may be provided a number theory or statistical problem. This provides a strong form of attachment between the user and the content provider who provisions the electronic content and the puzzles, which, in turn, may drive sustained user engagement with the provider's electronic content over a prolonged period of time in a fun, constructive, and rewarding way. It has been estimated that people, world-wide, spend over 3 billion hours a week playing online games, console-based games, and puzzles. Richard Feynman once said, "Once I get on a puzzle, I can't get off." As users become habitual players of puzzles, engagement with electronic content will increase because the users take on solving their personalized puzzles, and they cannot stop thinking about it until they have completed the puzzle. In this regard, user engagement can be measured in any suitable manner, such as an amount of time a user spends on an electronic site (e.g., over one or more sessions) that serves the electronic content, a frequency at which the user accesses the electronic content, and/or any other suitable metric. Users will likely derive satisfaction from completing puzzles, establish a share of mind with, become loyal to, and feel more positive about, the content provider's brand, and will feel emotionally invested with the content provider as a result.

In regards to provisioning clues, the techniques and systems described herein are directed, in part, to selecting distribution channels for clues in order to enable a content provider to obtain impression data associated with their distributed content. "Impression data," as used herein, means a number of times content (in any form, including electronic content, printed content, etc.) has been accessed or viewed by a user(s). As mentioned, it is often difficult to obtain impression data for content that is distributed by third party entities over distribution channels that the content provider (or the content creator) does not control. For instance, a television broadcaster may not be able to obtain, or may be reluctant to share, accurate impression data of its viewing users that access content broadcast over television networks. The same goes for publishers of print media, and/or a social networking site operators; the impression data of consuming users for content distributed via these channels is difficult for the content creating provider to obtain. Accordingly, techniques and systems are disclosed herein for providing puzzle clues within content that is created by a content provider, and which is, in turn, distributed to a mass audience via a distribution channel that is not controlled by the content provider. Thereafter, impression data associated with consumers of the distributed content can be collected based on receiving puzzle feedback data from users indicating that puzzles have been completed after having distributed the clues in the content via third party distribution channels. This addresses the problem of obtaining content impression data for content distributed over third party distribution channels with a particular technical solution involving the provisioning of puzzle clues in mass-distributed content, and the collection of puzzle feedback data.

By employing the techniques and systems described herein, one or more devices can be configured to conserve resources with respect to communications bandwidth resources, processing resources, memory resources, power resources, and/or other computing resources. For example, by implementing the disclosed techniques and systems for obtaining impression data regarding mass-distributed content, a content provider may become more efficient and selective as to the distribution channels for its content, which may, in turn, lead to downstream conservation of computing resources, such as reducing network bandwidth and related resources that are used for distributing electronic content. Moreover, as will be described in more detail below, puzzle feedback data may lead to a better understanding of user predilections for items available in an electronic marketplace, which may, in turn, allow for improved management of item inventory available in the electronic marketplace, and similar downstream improvements to ecommerce fulfillment. Additional technical effects to those described herein may also be realized from an implementation of the technologies disclosed herein.

Also described are systems and devices comprising one or more processors and one or more memories, as well as non-transitory computer-readable media storing computer-executable instructions that, when executed, by one or more processors perform various acts and/or processes disclosed herein.

FIG. 1 illustrates an example environment 100 in which a user 102 may access electronic content (or at least a portion of the electronic content) served by a content provider 104, and in so doing, the user's client device 106 may output a puzzle 108 that is personalized to the user 102. As illustrated, one or more computing devices 110 of the content provider 104 may have access to a repository of puzzles 108(1), . . . , 108(N) (collectively 108), and may receive a request from the client device 106 to access a portion of electronic content 107 provided by the content provider 104.

A "puzzle" (sometimes referred to herein as a "puzzle-based game"), as used herein, refers to any type of game, problem, and/or creative exercise that is designed to be played in accordance with a set of rules until completion. A puzzle may be designed to test a user's ingenuity, knowledge, skill, creativity, and/or luck, and may be completed upon one or more criteria being satisfied. A criterion for completing a puzzle may be that a user 102 performs a specified task(s). A criterion for completing a puzzle may be that a user 102 provides a correct answer to the puzzle. Accordingly, in some implementations, "completing" a puzzle may include "solving" a puzzle, while, in other implementations, "completing" a puzzle may include the user 102 performing a specified task(s), such as the user 102 making one or more choices (e.g., a creative choice(s)) or providing one or more inputs (e.g., a creative input(s)).

In the example of FIG. 1, the user 102 may decide to access electronic content 107 of the content provider 104. The user 102 may utilize the client device 106 when accessing the electronic content 107 of the content provider 104. Although the example of FIG. 1 depicts a mobile phone 106, the user 102 can access electronic content 107 using any type of client device 106 (sometimes referred to herein as "client computing device 106") including, without limitation, a personal computer, a laptop computer, a desktop computer, a portable digital assistant (PDA), a mobile phone, tablet computer, an electronic book (eBook) reader device, a set-top box, a game console, a voice-controlled speaker assistant device, a smart television, a wearable device (e.g., a smart watch, electronic "smart" glasses, a fitness tracker, etc.), an in-vehicle computer, or any other electronic device that can transmit/receive data over a computer network(s) 112.

The network(s) 112 is representative of many different types of networks, and may include wired and/or wireless networks that enable communications between the entities in the environment 100. In some embodiments, the network(s) 112 may include cable networks, the Internet, local area networks (LANs), wide area networks (WAN), mobile telephone networks (MTNs), and other types of networks, possibly used in conjunction with one another, to facilitate communication between the computing device(s) 110 and the client device 106. Although embodiments are described in the context of a web based system, other types of client/server-based communications and associated application logic could be used.

To interact with the content provider's 104 system, the client device 106 may display a browser, as shown in FIG. 1, or the client device 106 may display a downloaded or cloud-based application, or any other client application. However the techniques and systems described herein are not limited to displaying a user interface on a display of the client device 106. For example, electronic content 107 may be received by a voice-controlled speaker assistant device and converted into an audible form (e.g., text-to-speech) that is then output to the requesting user 102 via a speaker(s) of the voice-controlled device. Thus, the example of FIG. 1 is merely an illustrative example of how a user 102 may interact with the content provider's 104 electronic content 107. FIG. 1 shows a browser 114 that may be rendered on a display of the client device 106 in response to the client device 106 sending, and the computing device(s) 110 receiving, a request to access electronic content 107 of the content provider 104. In some implementations, the request from the client device 106 may include a request to access an electronic site hosted by the computing device(s) 110 of the content provider 104, the electronic site corresponding to an electronic marketplace that serves electronic content 107 in the form of text, images, and/or video about items that are available in the electronic marketplace. Here, the electronic content 107 is in the form of text, images, and interactive elements on an item detail page that shows a shoe product the user 102 may be considering for purchase.

In response to the user's 102 request to access the electronic content 107, the computing device(s) 110 of the content provider 104 may cause the client device 106 to output a puzzle 108 that includes a theme, or may be a type of puzzle 108, that corresponds to a predilection of the user 102. In this case, user data may be available to the computing device(s) 110 about the user 102, and the computing device(s) 110 can use this user data to determine a predilection(s) of the user 102. In this case, the computing device(s) 110 determine that the user 102 has a predilection for shoes. Accordingly, in the example of FIG. 1, a shoe-based, or shoe-themed, puzzle 108 is output on the client device 106 (e.g., displayed on a display of the client device 106) along with the electronic content 107. In this manner, the puzzle 108 is personalized to the user 102.

The puzzle 108 may also include an incentive. In FIG. 1, the incentive is provided in the form of an offer to provide a reward to the user 102 associated with the request in exchange for the user 102 completing the puzzle 108. For example, the user 102 may be offered a 20% discount on a next purchase of a shoe item available in the electronic marketplace in exchange for the user 102 completing the puzzle 108. It is to be appreciated that the puzzle 108 may not include (may omit) an incentive. Thus, the puzzle 108 may be output without any indication of a reward that is to be provided upon completion of the puzzle 108. In other words, the user 102 may be "surprised" with a reward when the user 102 completes the puzzle 108. In other embodiments, the puzzle 108 may include an incentive that does not actually reveal the reward that is to be provided upon puzzle completion, yet the incentive provides some indication of a benefit to be received by the user 102 upon puzzle completion. For example, the puzzle 180 may be provided along with an indication that the user will receive a benefit (e.g., a discount, a prize, etc.) upon completing the puzzle 108, without telling the user 102 exactly what will be received upon puzzle completion. In some embodiments, the incentive may indicate that the user 102 has a chance to win a reward ranging in value from a modest value (e.g., a $5 off coupon) to a greater value (e.g., a free membership to an exclusive club for a year, where members of the club receives preferential treatment on deliveries, such as same day delivery, and/or preferential treatment on discounts of items, access to content, etc.). Another example of an incentive that may be provided along with the puzzle 108 may be a promise to provide the user 102 with a more challenging puzzle upon completion of the current puzzle 108. Thus, an "incentive"—when one is provided along with the puzzle 108—may be anything that incentivizes the user 102 to engage with the puzzle 108. In some cases, this incentive may indicate that a reward is to be received upon completion of the puzzle 108, regardless of whether or not the user 102 is informed of the actual reward when he/she receives the puzzle 108.

The example puzzle 108 of FIG. 1 tasks the user 102 with searching and/or browsing the electronic marketplace to find an item (and specifically the identification number (IN) of an item) that matches the shoes that are shown in a picture 117. If the user 102 enters a correct identification number into a field 118 (e.g., a field 118 provided in a widget that is presenting the puzzle 108) and selects a "submit" 120 soft button presented next to the field 118, the client device 106 may send, and the computing device(s) 110 may receive, data indicating that the user 102 has completed the puzzle 108, and, in response, the content provider 104 may provide the reward (in this case, a 20% discount on a next shoe purchase) to the user 102 in exchange for completing the puzzle 108. Thus, FIG. 1 illustrates a technique and systems for providing a personalized puzzle 108 to a user 102 as a means of driving sustained engagement of the user 102 with the electronic content 107 of the content provider 104.

Figure 2:
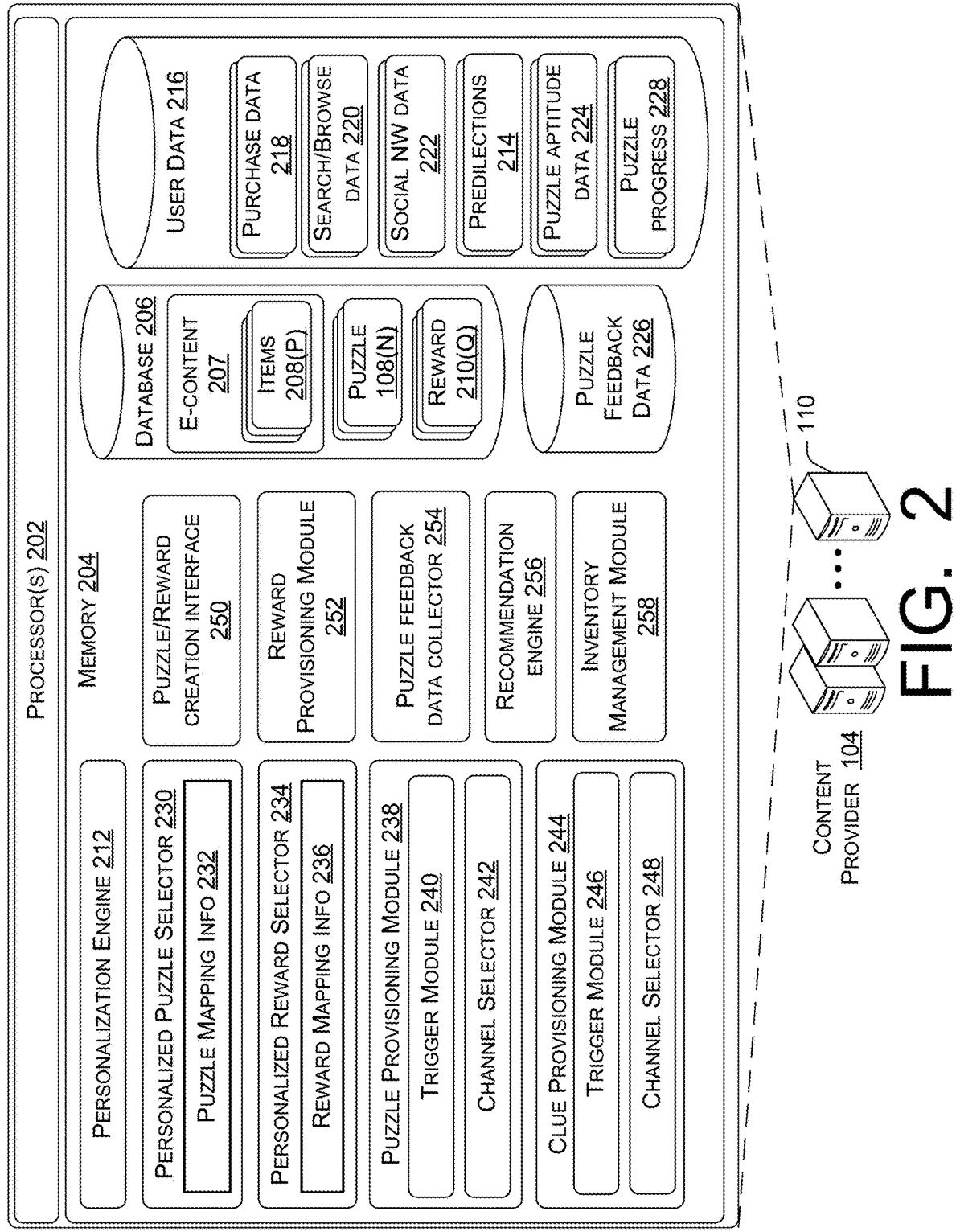
FIG. 2 illustrates an example computer architecture that may be employed by the content provider of FIG. 1. As illustrated, the computer architecture may include, among other things, a personalized puzzle selector to select personalized puzzles for provisioning to particular users based on determined predilections of the users.

FIG. 2 illustrates an example computer architecture that may be employed by the content provider 104 of FIG. 1. The content provider 104 may represent any type of entity that provides electronic content 207 of any kind (e.g., text, images, videos, interactive elements, graphics, multimedia, etc.), and who makes that electronic content 207 accessible to a user community through the use of client devices 106 that are configured to receive, from the computing device(s) 110 of the content provider 104, electronic content 207 over the computer network(s) 112 (e.g., in response to requesting access to the electronic content 207). As such, the content provider 104 may represent an e-commerce retailer, a content (e.g., audio and/or video) streaming service provider, an operator of a social networking site, a news site, a gaming platform/site, a blog site, a discussion forum site, and/or any other entity that uses an electronic platform (e.g., an electronic site, such as a website or an intranet site, a downloaded or cloud-based client application, or a voice-controlled speaker assistant with text-to-speech and voice recognition capabilities, etc.) to distribute electronic content 207 to a user community with access to client computing devices 106. Many of the examples described herein pertain to a content provider 104 in the form of an e-commerce retailer who may host an electronic marketplace, available via an electronic site, a client application, and/or a voice-controlled speaker assistant device, among other mechanisms configured to access the electronic content 207. It is to be appreciated, however, that the techniques and systems described herein are not limited to electronic content provided in an electronic marketplace. For instance, personalized puzzles 108 may be provisioned with electronic content 207 that is provided on any type of electronic platform other than one that provides an electronic marketplace, as described herein and/or known to a person having ordinary skill in the art.

The one or more computing devices 110 of the content provider 104 may comprise one or more server(s) arranged in a cluster or as a server farm, and across multiple fleets. The computing device(s) 110 may be maintained and/or operated by the content provider 104, and may be equipped with one or more processors 202 and one or more forms of computer-readable memory 204. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read-only memories (CD-ROMs), digital video discs (DVDs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The memory 204 may store otherwise have access to a database 206 that stores, among other things, electronic content 207. This electronic content 207 may sometimes be referred to herein as "primary" electronic content 207, as distinguished from secondary electronic content, such as electronic content in the form of the puzzles 108 described herein. Accordingly, the primary electronic content 107 may include, without limitation, text, images, videos, interactive elements, graphics, multimedia, and the like. FIG. 2 illustrates an example where the electronic content 207 includes digital representations of items 208(1), . . . , 208(P) (collectively 208).

The digital representations of the "items" 208 that are stored in the database 206, as used herein, may represent tangible items, intangible items, products, goods, services, a bundle of items, digital goods or services that are downloaded or streamed (e.g., media clips), sellable units, events, or anything else which might be consumed, purchased, rented, subscribed to, leased, loaned or viewed (hereinafter "acquired") physically, digitally or otherwise via a payment transaction. In this manner, the database 206 may, in some instances, represent an electronic catalog of items 208 that can be offered to users for acquisition in an electronic marketplace. Accordingly, users, such as the user 102, may search and/or browse for, and subsequently acquire, particular ones of the items 208 from the content provider 104.

In some examples presented herein, a user 102 with a particular predilection may express an interest in an item 208, such as by searching for the item 208, and/or browsing to a detail page of the item 208, and, in response, the content provider 104 may identify a puzzle 108 that corresponds to the user's 102 predilection, and may provide that personalized puzzle 108 to the user, such as by presenting the puzzle 108 in a widget (e.g., a pop-up window) on the item's 208 detail page in the electronic marketplace.

As illustrated, the database 206 may also store rewards 210(1), . . . , 210(Q) (collectively 210), which are offered to users in exchange for completing the aforementioned puzzles 108. The database 206 may store the puzzles 108 themselves as well. The puzzles 108 described herein may be classified in various categories including, without limitation, word lists, number series, cross sums, number fill-ins, number theories, statistical puzzles, cryptograms, anagrams, riddles, logical reasoning, trivia (e.g., movies, places, history, music, and/or products, etc.), guessing games (e.g., name that tune, name the artist of a painting, etc.), crosswords (e.g., circle eights, giant eights, triple squares, all threes, word squares, etc.), matching games/puzzles, spatial reasoning puzzles, such as tiling-based or image-based puzzles (e.g., jigsaw, packing, edge matching, multi-forms/poly-forms, etc.), or other geometrical puzzles, and so on.

In some implementations, an individual puzzle 108 may include a single level, or multiple levels (e.g., level 1, level 2, level 3, and so on) that are to be completed in order to consider the puzzle 108 as having been completed (e.g., solved). The puzzles 108 can also be single player, or multi-player (e.g., collaborative, competitive, etc.), as will be described in more detail below. Furthermore, the puzzles 108 may be associated with (e.g., tagged with, mapped to, etc.) a difficulty level (e.g., easy, medium, hard, or variances thereof). Puzzles 108 may also be associated with (e.g., tagged with, mapped to, etc.) one or more predilections. For instance, the content provider 104 may define a set of predilections that can be associated with individual puzzles 108. As used herein, a "predilection" refers to a preference, an interest, a like, and/or a special liking of the user 102 for something. When associated with a puzzle 108, a predilection can be considered a "theme" of the puzzle 108 that corresponds to the predilection. For example, a shoe-themed puzzle 108 may be associated with a predilection for shoes (e.g., a tag indicating that the puzzle 108 is associated with a predilection called "shoes"). In this manner, a puzzle 108 that is personalized to a user's 102 predilection may be provided to the user 102 to engage the user 102 with the electronic content 207. Various example types and themes of puzzles 108 will now be described, by way of example and not limitation.

A philosophy-themed puzzle 108, such as a paradox, may be provided to a user 102 with a predilection for philosophy. A photography-themed puzzle 108, such as a puzzle 108 that asks the user 102 to guess where a photograph was taken and/or who took the photograph, may be provided to a user 102 with a predilection for photography. A music-themed puzzle 108, such as a puzzle 108 that asks the user to guess the artist and/or the song by listening to a sample (e.g., a few seconds) of a song or tune, may be provided to a user 102 with a predilection for music. An art-themed puzzle 108, such as a puzzle 108 that shows a painting to the user 102 and asks the user 102 to guess the painter, may be provided to a user 102 with a predilection for art. A movie-themed puzzle 108, such as a puzzle 108 that asks the user 102 to guess the name of a director of, or an actor in, a movie, may be provided to a user 102 with a predilection for movies. As shown in FIG. 1, a shoe-themed puzzle 108, such as a puzzle 108 that shows a photograph of someone wearing shoes to the user 102 and asks the user 102 to provide the identification number of an item 208 matching the shoes in the photograph, may be provided to a user 102 with a predilection for shoes. A mathematics-themed puzzle 108, such as one that asks the user 102 to provide the identification number of an item 208 in the price range of $x-$y whose listed purchase price is a difference between two consecutive prime numbers, may be provided to a user 102 with a predilection for mathematics. Another example of a mathematics-themed puzzle 108 may be one where the user 102 is asked to identify the mathematical relation between the day and the year in the date (dd/mm/yyyy) of the user's 102 most recent purchase from the electronic marketplace of the content provider 104. A history-themed puzzle 108, such as a puzzle 108 that asks the user 102 to provide the identification number of an item 208 in the price range of $x-$y that describes an event in American history that relates to George Washington, may be provided to a user 102 with a predilection for history. Another example of a history-themed puzzle 108 may be one where the user 102 is asked to identify an event that occurred on the same day of the user's 102 most recent purchase 100 years ago in the United States. A literature-themed puzzle 108, such as a puzzle 108 that asks a user 102 to provide the identification number of an item 208 in the price range of $x-$y that is written by an author who died in the second world war, may be provided to a user 102 with a predilection for literature. Another example of a literature-themed puzzle 108 may be one where the user 102 is asked to identify a book written by J. K. Rowling that mentions an item 208 the user 102 recently purchased. It is noted that many of these example puzzles 108 either task the user 102 with finding an item 208 available in the electronic marketplace that serves the primary electronic content 207 of the content provider 104, or provide a clue that is based on a past purchase made by the user 102 via the electronic marketplace. Relating the puzzles 108 to the electronic marketplace in this manner drives further engagement of the user 102 with the primary electronic content 207.

The puzzles 108 in the database 206 may, in some implementations, include a creative exercise that is designed to reveal user preferences for items 208 in the electronic marketplace. For example, consider an example puzzle 108 based on a fidget spinner shown to the user 102, perhaps when the user 102 is searching and/or browsing for fidget spinners in the electronic marketplace of the content provider 104. Such a puzzle 108 may show, on the display of the client device 106, options for creating a customized fidget spinner product by letting the user 102 select from different available shapes, materials (e.g., metal/plastic), and/or other design options (e.g., speaker/light/stone-studded, Latin engraving/an emoji, etc.). This example puzzle 108 can be cast as a spinner-assembly game, in the same spirit as children's block-assembly games. This can help the content provider 104 understand the user's 102 preferences at a more granular level, and such information can be fed back to the content provider's item 208 recommendation engine, on-the-fly, to suggest, for the user 102, the most relevant fidget spinners, optionally with an incentive such as a discount upon completion of a spinner assembly puzzle-based game 108. Providing such puzzles 108 to multiple users may lead to new designs that can be helpful for fidget spinner manufacturers, and/or customizing the inventory of items 208 in the electronic marketplace.

As mentioned, the puzzles 108 can be provided in multi-player versions (e.g., with multi-player settings) in addition to single player settings. In a cooperative/collaborative version of the fidget spinner puzzle 108, the user 102 can be shown, on the display of the client device 106, a semi-constructed puzzle piece, previously worked by other users, in the above spinner assembly puzzle 108, to complete the spinner design. This elicits user collaboration in completing a customized fidget spinners. Successful product designs may be those that are voted on by the user community as the best designs, and or those that are actually made into a product by a product manufacturer. Higher value rewards, such as bigger discounts, may be provided to those users 102 who are involved in creating such successful product designs during puzzle play. In a competitive version of the fidget spinner puzzle 108, the user 102 can be shown a set of already designed spinner products by other users, possibly ranked by the user's 102 preferences and popularity (in terms of how many users worked on the puzzle piece), and asked to alter the spinner to add a radical novelty to the design. A top subset of spinner designs (e.g., as determined from voting of the user community) each day may be given a reward, such as a discount. This may create a competition with other players, resulting in better spinner design prototypes. The above examples of the fidget spinner, creative puzzle 108 may come with an allotted budget with each piece of the spinner have some cost, and the user 102 provide the novelty and creativity in designing the spinner at the various stages of the puzzle 108 respecting the budget constraints at each stage. In other words, the budget may act as a rule for completing the puzzle 108.

Thus, puzzles 108 may be designed as creative exercises in order to understand user preferences at a more granular level in a particular context (what type of spinner the user 102 really likes), which is valuable information for recommendation and targeting of users with items 208. Better product designs may be created due to collaboration and competition, which can help product manufacturers stay more engaged in selling their products via the electronic marketplace, and may result in higher customer satisfaction due to the availability of buying something they designed at a discount.

Multi-player puzzles 108, in addition to being collaborative and/or competitive, can additionally, or alternatively, be augmentative. For instance, a reward may be provided to multiple users who complete a puzzle 108 on the condition that a number or percentage of users who complete the puzzle 108 meets or exceeds some threshold number or percentage of users. In an example, multiple users may be provided puzzles 108, wherein each puzzle is personalized to each user according to that user's 102 predilection, but the reward is provided in response to a particular percentage (e.g., 90%) of the users successfully completing their respective puzzles 108.

FIG. 2 shows that the memory 204 may further store, or have access to, a personalization engine 212 for determining predilections 214 for particular users, such as the user 102. In some implementations, the personalization engine 212 may be configured to determine whether users, such as the user 102, have one or more predilections from a set of predilections that have been previously-associated with the puzzles 108 in the database 206. The predilections 214, once determined by the personalization engine 212, may be stored in user data 216 that the content provider 104 maintains for users of its system. The personalization engine 212 may be configured to analyze various portions of the user data 216 in order to determine the predilections 214. The personalization engine 212 can also utilize various personalization techniques to determine the predilections 214 from the user data 216, such as techniques including, without limitation, statistical methods, collaborative filtering, machine learning, and/or receiving explicit preferences from users as part of a registration and/or survey process.

For example, the personalization engine 212 may be configured to determine, for a given user 102, statistics regarding different item 208 attributes, such as statistics regarding different sellers of items 208, item categories, and/or the items 208 themselves, associated with past purchase data 218 and/or past search and/or browse data 220 of the user 102. For example, the purchase data 218 for a particular user 102 may indicate a significant number (e.g., more than one) of past purchases made by the user 102 from a particular seller, or of items 208 in a particular item category, which may be taken as a signal that the user 102 likes/prefers the particular seller and/or the particular item category. Similarly, the search/browse data 220 may indicate that the user 102 has searched for, or clicked on browse nodes pertaining to, a particular item 208, item category, and/or seller, which may also be taken as a signal that the user likes/prefers those searched-for, or browsed-for, things. Any type of item 208 attribute can be analyzed in this manner, such as price points of items 208, customer ratings of items 208, and the like, to determine user predilections 214.

As another example, social network data 222 (which, upon receiving consent from the user 102, may be imported from a third party social networking site(s)) may include the user's 102 social networking posts, likes, comments, reviews, and the like. These activities on the social networking site may mention the user's 102 sentiment(s) toward a certain thing(s) (e.g., "I love hiking"). The personalization engine 212 may analyze this social networking data 222 of the user 102, to determine predilections 214 of the user 102. In the above example, a predilection for hiking may be determined from a social networking post made by the user 102 about how he/she loves hiking. Any statistical measures (e.g., mean, median, mode, frequency, etc.) may be analyzed with respect to the user data 216 to determine the predilections 214 (e.g., an average number of purchases, search queries, browse actions, and/or social posts, meeting or exceeding some threshold before a predilection 214 is determined for the user 102). Calculating statistics from user data 216 (e.g., purchase data 218, search/browse data 220, social networking data 222, etc.) can lead to statistical insights regarding frequencies at which users 102 direct behavioral actions toward something in particular.

As another example, the personalization engine 212 can use collaborative filtering techniques, such as determining groupings of users with similar characteristics or demographics (e.g., users that live and work in the same neighborhoods/cities, users of the same age, gender, etc.) and determine the predilections 214 for any user 102 in an affinity group based on purchase data 218, search/browse data 220, and/or social networking data 222 of some or all of the other users in the same affinity group. For example, past purchases of users who are of the same gender and age as the user 102 in question, and who live in the same city as the user 102 in question, may be indicative of the predilection(s) 214 of the user 102.

The personalization engine 212 may implement machine learning techniques or algorithms to determine predilections 214 for users. In this case, a set of inputs can include inputs from the customer data 216, including the purchase data 218, the search/browse data 220, and/or the social networking data 222, and the objective function may be one that attempts to maximize an engagement metric such user session duration, frequency of site visits, and the like, with puzzles 108 that are recommended according to the predilections 214. The personalization engine 212 may utilize any suitable machine learning model(s) including, without limitation, logistic regression-based classification models, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, or an ensemble of one or more of the aforementioned techniques.

Additionally, or alternatively, users may provide user input specifying explicit predilections 214, such as general interests, music preferences, food preferences, hobbies, preferences for types of sellers, specific sellers, types of items 208, item categories, price ranges for items 208, customer ratings of items 208, and so on. This may be done in the context of a survey, and/or during a registration process with the content provider 104.

In some implementations, the personalization engine 212 may be configured to determine puzzle aptitude data 224, which may include a level of expertise of particular users for completing puzzles 108. The personalization engine 212 may use puzzle feedback data 226 to make this determination, wherein the puzzle feedback data 226 includes, among other data, data regarding past attempts made by the user 102 to complete puzzles previously provisioned to the user 102, including the time taken to complete the puzzle 108, a number of attempts at providing a correct answer to the puzzle 108, a number of clues provisioned before completing the puzzle 108, online behavior (e.g., searching and/or browsing behavior) during puzzle play, and so on. For example, the personalization engine 212 may be configured to analyze a user's 102 success rate with respect to puzzles 108 of various difficulty levels that have been provisioned to the user 102 as a way of determining the user's 102 level of puzzle expertise, and may store this level of expertise in the puzzle aptitude data 224 with respect to the user 102.

The user data 216 is also shown as including puzzle progress 228 for users who are playing active puzzles 108. For example, a user 102 may complete two out of three levels of a puzzle 108, and may leave his/her current browse session before completing the puzzle 108. In this scenario, the user's 102 puzzle progress 228 may indicate that the user is on level 3 of the puzzle 108, but has not completed level 3 of the puzzle 108. In this manner, users 102 can work on completing a puzzle 108, but may terminate a session and come back to the puzzle 108 at a later time without losing their place in the progress of completing the puzzle 108.

It is to be appreciated that the user data 216 may include other types of user-specific data, such as general account information (e.g., user credentials, such as username, password, etc.), geographic locations (e.g., shipping addresses) associated with the users, contact information (e.g., email address, etc.) for the users, lists of items 208 maintained by the users, and/or an array of other characteristics associated with the users.

As illustrated, the memory 204 may further store, or have access to, a personalized puzzle selector 230 for selecting, from the available puzzles 108, a puzzle(s) 108 that is personalized for a given user 102. The personalized puzzle selector 230 may utilize puzzle mapping information 232 that maps user predilections 214 to puzzles 108 for this purpose. Additionally, or alternatively, the puzzles 108 stored in the database 206 may be tagged with predilections 214 as a means of identifying puzzles that are personalized to the user 102. Other ways of associating predilections 214 to puzzles 108 are contemplated herein without departing from the basic characteristics of the disclosed techniques and systems. As an example, the puzzle mapping information 232 may indicate that particular puzzles 108 of the available puzzles 108 are literature-themed puzzles, music-themed puzzles, mathematics-themed puzzles, fashion-themed puzzles, and so on. The puzzle mapping information 232 may be hierarchical in that a given puzzle 108 may be mapped to multiple predilections 214 at different levels, such as a predilection 214 for fashion, and also to a predilection 214 for shoes, which may be a sub-predilection of fashion. As another example, a predilection 214 for non-fiction literature may be a sub-predilection of the predilection 214 for literature.

The puzzle mapping information 232 may further map puzzle aptitude data 224 (e.g., puzzle expertise) of users 102 to puzzle difficulty levels. For example, the puzzle mapping information 232 may indicate which puzzles 108 are easy, medium, or hard in terms of the difficulty level and/or what user expertise levels those difficulty levels map to. For example, novice puzzle-playing users may be provided easy puzzles 108, competent puzzle-playing users may be provided medium-difficulty puzzles 108, and/or expert puzzle-playing users may be provided hard puzzles 108.

Figure 3:
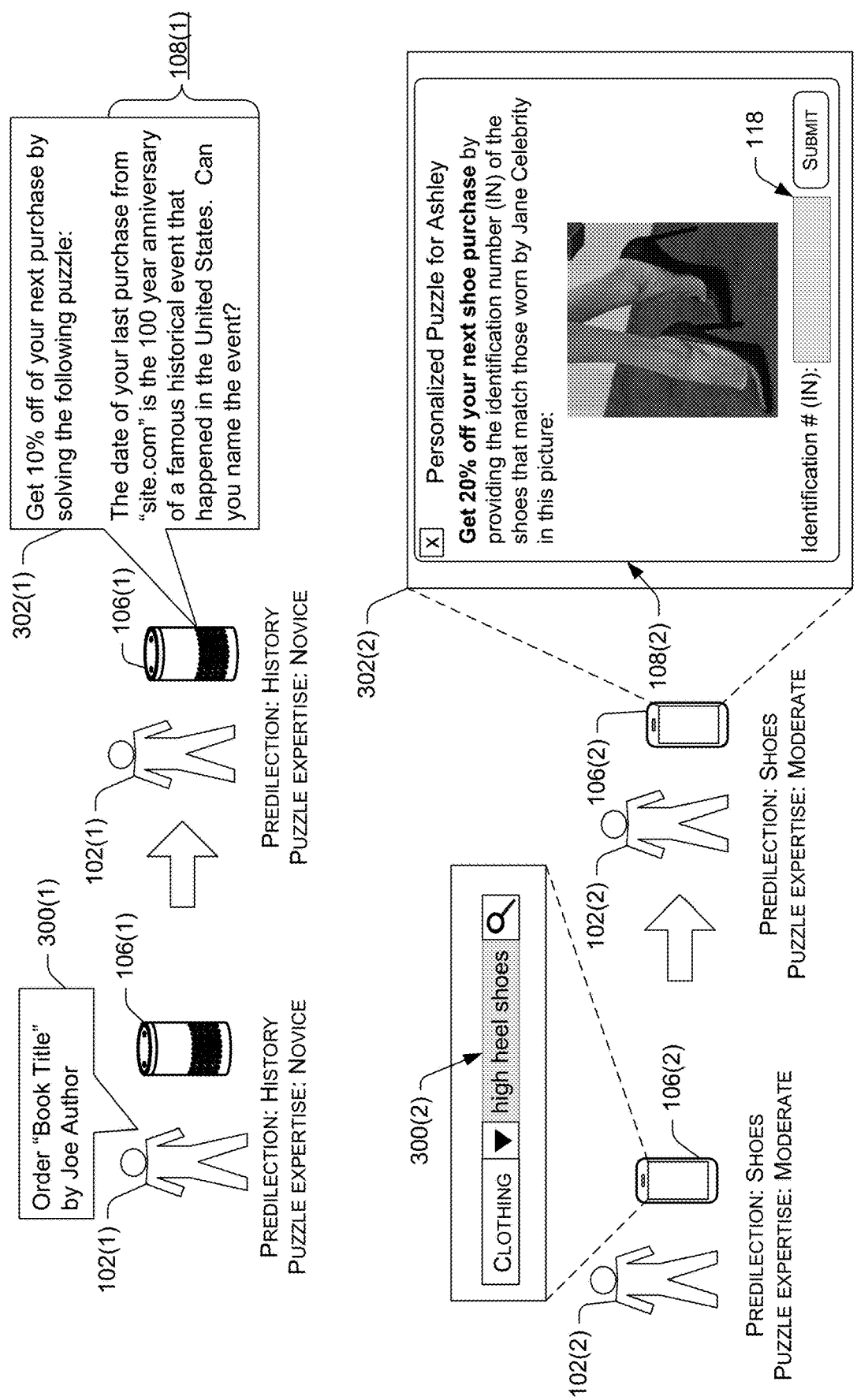
FIG. 3 illustrates an example diagram where two different users who have been associated with different predilections (history and shoes, respectively) are accessing electronic content of the content provider. In response, the content provider causes each user's client device to output a puzzle that is personalized to each user's predilection (here, a history-themed puzzle to the first user, and a shoe-themed puzzle to the second user).

Turning briefly to FIG. 3, an example scenario is shown where a first user 102(1) with a predilection for "history," and a puzzle expertise of "novice," expresses interest in an item 208 by issuing a voice command 300(1) to a first client device 106(1). Here, the first client device 106(1) is a voice-controlled speaker assistant device that receives the voice command 300(1) as input via a microphone(s), and interacts with the remote content provider's 104 system (e.g., the computing device(s) 110) to output an audible response 302(1) to the user. Here, the first user askes (in the voice command 300(1)) to order a particular book from the content provider 104. In the audible response 302(1), the first client device 106(1) outputs a first personalized puzzle 108(1), which is catered to the user's predilection 214 of "history" because the first personalized puzzle 108(1) is history-themed, and is also chosen as a history-themed puzzle that is at a difficulty level appropriate for the user's 102(1) level of puzzle expertise (e.g., an easy puzzle 108(1) for the novice puzzle playing user 102(1)). It is noted that the first personalized puzzle 108(1) shown in FIG. 3 is an example of a puzzle 108 that provides a clue that is based on a past purchase made by the user 102(1) via the electronic marketplace of the content provider 104.

Meanwhile, a second user 102(2) is shown as operating a second client device 106(2) (here, a mobile phone) to request electronic content 207 from the content provider 104 by entering a search query 300(2). In this example, the search query 300(2) happens to include the term "shoe" with other modifying terms. Whether based on the current search query 300(2), or on historical user data 216 about the second user 102(2), the content provider 104 may determine that the second user 102(2) has a predilection for "shoes," and a puzzle-playing expertise of "moderate" due to the user's 102(2) past success rate of previously-provisioned puzzles 108. In response to the search query 300(2), the second client device 106(2), upon interacting with the content provider's 104 system (e.g., the computing device(s) 110), may provide a response 302(2) by outputting search results (i.e., primary electronic content 207), along with a second personalized puzzle 108(2) on a display of the second client device 106(2). The second puzzle 108(2) is catered to the user's predilection of "shoes" because the second personalized puzzle 108(2) is shoe-themed. The second puzzle 108(2) is also chosen at a difficulty level appropriate for the user's 102(2) level of puzzle expertise (e.g., a medium-difficulty puzzle 108(2) for a moderate (or competent) puzzle-playing user 102(2)). It is noted that the second personalized puzzle 108(2) shown in FIG. 3 is an example of a puzzle 108 that tasks the user 102(2) with finding an item 208 available in an electronic marketplace that serves the primary electronic content 207.

Each of the users 102(1) and 102(2) may "play" their personalized puzzles 108 (i.e., try to complete (e.g., solve) the puzzles 108(1) and 108(2)) by providing user input to their respective client devices 106(1) and 106(2). For example, the first user 102(1) can issue another voice command with the answer to the first puzzle 108(1) by naming the historical event in a subsequent voice command. The second user 102(2) can search and/or browse the electronic marketplace of the content provider 104 to find the matching item 208, determine the identification number of the item 208, and enter the identification number in the field 118.

Referring again to FIG. 2, the memory 204 may further store, or have access to, a personalized reward selector 234 for selecting, from the available rewards 210 in the database 206, a reward(s) 110 that is personalized for a given user 102. The personalized reward selector 234 may utilize reward mapping information 236 that maps user predilections 214 to rewards 210 for this purpose. Additionally, or alternatively, the rewards 210 stored in the database 206 may be tagged with predilections 214 as a means of identifying rewards 210 that are personalized to the user 102. Other ways of associating predilections 214 to rewards 210 are contemplated herein without departing from the basic characteristics of the disclosed techniques and systems. As an example, the reward mapping information 236 may indicate that particular rewards 210 of the available rewards 210 are literature-themed rewards, music-themed rewards, fashion-themed rewards, and the like. In a similar manner to that described herein with respect to the puzzle mapping information 232, the reward mapping information 236 may also be hierarchical (e.g., a fashion-themed reward may also be associated with a predilection for "shoes" or "hats" or any other type of fashion sub-predilection).

The reward mapping information 236 may further map rewards 210 to puzzles 108. For example, the reward mapping information 236 may indicate which rewards 210 may be provisioned with particular puzzles 108. In some cases, rewards 210 may be mapped to puzzles 108 according to the puzzles' 108 difficulty levels. For instance, more difficult puzzles 108 may be associated with higher value rewards 210 (e.g., larger discounts), as compared to less difficult puzzles 108 that may be mapped to lower value rewards 210 in the reward mapping information 236.

The memory 204 may further store, or have access to, a puzzle provisioning module 238 for provisioning puzzles 108 to users, such as the user 102, at particular times and via particular channels. For example, the puzzle provisioning module 238 may include a trigger module 240 to determine appropriate times to provision puzzles 108 to users. For example, the trigger module 240 may determine that a puzzle 108 is to be output on a client device 106 of a user 102 in response to receiving a request from the client device 106 to access primary electronic content 207 of the content provider 104 (e.g., entering a uniform resource locator (URL) of the content provider's 104 website in a browser application). Thus, when the user 102 accesses an electronic site to browse items 208, the user 102 may be provided a personalized puzzle 108 in response to accessing the electronic site. In other implementations, the trigger module 240 may wait until a user 102 browses electronic content that pertains to a known predilection 214 of the user 102. For example, a user 102 with a known predilection for shoes may browse an electronic marketplace initially for non-shoe items 208, and then, upon searching for, or clicking on a browsing node related to, a shoe-related item 208, the trigger module 240 may trigger the puzzle provisioning module 238 to provision a personalized puzzle 108 (e.g., a shoe-themed puzzle 108) to the user 102, such as by causing the client device 106 to display a shoe-themed puzzle 108 in the context of the electronic marketplace browse session. In some implementations, the trigger module 240 may respond to a real-time predilection determination. For example, the trigger module 240 may be aware of a plurality of predilections 214 that are mapped to available puzzles 108 in the database 206, and the user 102 (who may not have a known predilection for shoes) may start browsing shoe-related items 208 in the electronic marketplace. The trigger module 240, seeing one or more shoe-themed puzzles 108 in the database 206, may trigger the puzzle provisioning module 238 to provision a shoe-themed puzzle to the user 102 in response to the user's 102 browsing behavior indicating that the user 102 is currently interested in shoes.

In some embodiments, the trigger module 240 may attempt to distinguish users 102 who are likely (e.g., at or above a probability threshold) to complete a purchase of one or more items 208 from other users 102 who are unlikely (e.g., below the probability threshold) to complete a purchase of an item 208 available in the electronic marketplace. By making this distinction between types of users 102, the trigger module 240 may provision puzzles 108 to these users 102 at different times according to the type of user 102. For instance, if, from past purchase data 218, it is determined that a user 102 is very likely (e.g., a 90% chance) to make a purchase of an item 208 during a current visit to an electronic site of the content provider 104, the trigger module 240 may refrain from providing a personalized puzzle to the user 102 until the user 102 completes the purchase of the item(s) 208. Thus, in response to the user 102 completing the purchase, the puzzle 108 can be provisioned to the user 102. This makes the purchase process a low friction process by not distracting a user 102 who is very likely to make a purchase. By contrast, if, from past purchase data 218, it is determined that another user 102 is unlikely (e.g., a 10% chance) to make a purchase of an item 208 during a current site visit, the trigger module 240 may not wait for the user 102 to make a purchase, and may provision a personalized puzzle 108 before the user 102 leaves the site of the content provider 104, in order to increase and/or maintain engagement of the user 102 with the electronic content 207 of the content provider 104.

The puzzle provisioning module 238 may include a channel selector 242 for selecting a distribution channel through which the puzzle 108 can be provisioned to the user 102. One example channel may be an electronic site that provides/serves the primary electronic content 207, such as a site of an electronic marketplace, or a social networking site. Thus, a puzzle 108 can be surfaced anywhere on such a site, including on an item detail page of an item 208, in a search results page, in a checkout page, or in various corresponding portions of a client application to access an electronic marketplace. A puzzle 108 can also be emailed to the user 102, texted to the user 102, or sent via other direct messaging channels, as well as in social networking feeds of the user 102, and the like. The channel selector 242 may select one or more of such channels to provision the puzzle 108 to a user 102. A puzzle 108 can be provisioned to the user 102 in electronic content 207 that is associated with a predilection 214 of the user 102, or with content 207 that is otherwise personalized to the user 102. For example, a recommended video clip may be streamed to the user's 102 client device 106, and the channel selector 242 may provision a personalized puzzle 108 before, during, or after playback of the recommended video clip on the client device 106. As another example, the channel selector 242 may determine a site, such as a blog site, that the user 102 has frequently accessed in the past, or that provides electronic content 207 associated with a predilection 214 of the user 102, and may provide a personalized puzzle 108 on the site (e.g., next to a blog post, etc.) during the user's 102 next visit to the site. As yet another example, the content provider 104 may recommend, to a user 102 who is currently browsing a particular item 208 available in an electronic marketplace, related items 208 that are similar to the particular item 208, and may provide a personalized puzzle 108 that tasks the user 102 with determining which of the recommended items 208 are offered by the same seller as the seller of the particular item 208, or some other type of matching puzzle 108. In this sense, the puzzle 108 can be provided in content that is personalized to the user 102. Additionally, or alternatively, the puzzle 108 can be provided in content that is not personalized to the user 102.

The memory 204 may further store, or have access to, a clue provisioning module 244 for provisioning clues that are designed to help users complete active puzzles 108. In a similar manner to the puzzle provisioning, the clue provisioning may occur at particular times and via particular channels. For example, the clue provisioning module 244 may include a trigger module 246 to determine appropriate times to provision clues. In one example, a first clue may be provided along with the initial provisioning of an associated puzzle 108, or a clue may not be provisioned until a period of time has passed since provisioning the puzzle 108, so long as the user 102 has not yet completed the puzzle 108. In this manner, clues may be provisioned, using the trigger module 246, at multiple different times (e.g., periodically at regular intervals, and/or in response to events). The trigger module 246 may operate using various modalities. One example modality is a "push" modality where puzzle clues are pushed to the user 102 without dependence upon an action taken by the user (e.g., providing, without dependence on a user action, the clue in a text message, an email, an audio or video clip, an advertisement, etc.). Another example modality is an "interactive" modality where puzzle clues are provided in response to some type of action taken by the user 102 with respect to content 207 of the content provider 104. For example, a new clue may be provisioned each time the user 102 starts a new session after having terminated a previous session, each day, in response to the user 102 performing an action (e.g., adding an item 208 to a cart in the electronic marketplace, adding an item 208 to a wish list in the electronic marketplace, purchasing the item 208 in the electronic marketplace, posting content online, accessing a content post from another user on a social networking site, etc.). The trigger module 246 may be configured to track a geographic location of the client device 106 of a user and provide puzzle clues when the user carries the client device 106 to a particular location (e.g., when the user arrives home from work on a workday). If the content provider 104 provides a streaming service for audio and/or video content (i.e., primary electronic content 207), the trigger module 246 may provision clues when the user 102 streams audio and/or video content from the content provider 104. In some implementations, the trigger module 246 may vary the time intervals for providing clues based on the difficulty level of the puzzles 108. For example, for hard puzzles, clues may be provisioned more often (at a higher frequency), while clues may be provisioned less often (at a lower frequency) for easy puzzles. The trigger module 246 may monitor user attempts at completing (e.g., solving) the puzzle 108, and may determine to provision a clue after a threshold number of attempts have been made.

The clue provisioning module 244 may further include a channel selector 248 for selecting a distribution channel through which a clue can be provisioned. Similar to the puzzle 108 provisioning, there may be multiple possible channels through which clues can be provisioned. One example channel may be an electronic site that provides/serves the primary electronic content 207, such as a site of an electronic marketplace, or a social networking site. Thus, a clue can be surfaced anywhere on such a site, including on an item detail page of an item 208, in a search results page, in a checkout page, or in various corresponding portions of a client application that is used to access an electronic marketplace. A clue can also be emailed to the user 102, texted to the user 102, or sent via other direct messaging channels, as well as in social networking feeds of the user 102, and the like. The channel selector 248 may select one or more of such channels to provision the clue for a particular user 102, or for multiple users with the same active puzzle 108. In addition, puzzle clues can be provisioned to the user 102 within, or by leveraging, electronic content 207 that is associated with a predilection 214 of the user 102, or content 207 that is otherwise personalized to the user 102. For example, a video clip that is recommended for the user 102 may include a puzzle clue, or a puzzle clue may be presented before, during, or after playback of the recommended video clip on the client device 106. As another example, the channel selector 248 may determine a site, such as a blog site, that the user 102 has frequently accessed in the past, or that provides electronic content 207 associated with a predilection 214 of the user 102. In this scenario, the channel selector 248 may provide a puzzle clue somewhere on the site (e.g., next to a blog post, etc.), or the content provider 104 may inform the user 102 that a puzzle clue is within existing content on the site (e.g., mentioned in a particular blog post, etc.). In this sense, puzzle clues can be provided in content that is personalized to the user 102. Additionally, or alternatively, the puzzle clues can be provided in content that is not personalized to the user 102.

FIG. 4 illustrates an example where a clue is provisioned by embedding the clue within a list of customer reviews on a web page. For instance, FIG. 4 shows a web page 400 that may be rendered on a client device 106 of a user 102 who is currently reading customer reviews of an item 208 available in an electronic marketplace of the content provider 104. The customer reviews include a first customer review 402(1), a second customer review 402(2), and a third customer review 402(3) that may be presented on the web page 400 when the user 102 is accessing a customer review portion of the electronic marketplace. FIG. 4 also shows a puzzle clue 404 embedded (or inserted, disposed, etc.) between the first and second customer reviews 402(1) and 402(2). This may be a fun and interactive way to provision puzzle clues 404 to a user 102, and this manner of clue provisioning may drives user engagement with the primary electronic content 207 (here, the electronic content 207 comprising text and interactive elements pertaining to customer reviews 402). In the example, the user 102 has a known predilection for shoes, and was previously provisioned a shoe-themed puzzle 108, such as the shoe-themed puzzle 108(2) shown in FIG. 3. The puzzle clue 404 in FIG. 4 provides a hint for the user 102 that is designed to help the user 102 complete the puzzle 108. In this case, the user 102 may read the clue 404, and then go back to searching for a shoe product sold by a seller whose name starts with the letter "L," and upon finding such a product, the user 102 may attempt to complete the puzzle by entering the identification number of the shoe product in the field 118 for completing the puzzle 108(2).

It is to be appreciated that the puzzle clue 404 can be embedded within, or may leverage, existing content (e.g., a customer review 402 itself), rather than being embedded between existing content (e.g., between sequential customer reviews 402). For instance, instead of positioning the puzzle clue 404 in between customer reviews 402, as is shown in FIG. 4, one of the customer reviews 402 can be leveraged as a puzzle clue for a given user 102. For example, the user 102 may be informed (e.g., via a text message, email, etc.) that a customer review 402 on the web page 400 mentions a phrase that is tied to the correct answer to the user's 102 active puzzle 108. Using the first personalized puzzle 108(1) of FIG. 3 as an example, the first user 102(1) may be informed that a customer review 402 of a particular item 208 mentions a famous person associated with the famous historical event that the user 102(1) is trying to determine to solve the puzzle 108(1). Thus, existing electronic content 207 can be leveraged to provide puzzle clues to users 102 in a fun and interactive way. This may further an objective of increasing user engagement with electronic content 207 of the content provider 104 because the user 102 is given extra incentive to explore the electronic content 207 for puzzle clues, and the user 102 may even learn something from the electronic content 207 that he/she otherwise may not have known if the puzzle clue had not been provisioned within, or by leveraging, existing content 207. For example, the user 102 may read a customer review 402 about an item 208 that the user 102 finds informative, leading the user 102 to purchase the item 208 or refrain from purchasing the item 208 (i.e., the user 102 can make better purchasing decision after reading customer reviews 402). It is to be appreciated that customer reviews content is merely an example of a type of content 207 that can be leveraged to provide puzzle clues to users 102 who are playing active puzzles 108, and that puzzle clues can be provisioned by leveraging other types of content.

In some embodiments, the channel selector 248 of the clue provisioning module 244 is configured to select the customer review 402 portion of an electronic site as the distribution channel for provisioning the clue 404 based on known past behavior of the user 102. For example, browse data 220 associated with the user 102 may indicate that the user 102 has a history of viewing customer reviews 402 of items 208 in the electronic marketplace at a frequency that meets or exceeds a threshold frequency (e.g., greater than or equal to twice a day). Based on this determination, the channel selector 248 can embed the puzzle clue 404 in between sequential customer reviews 402 in response to the trigger module 246 determining that the client device 106 is being used by the user 102 to view the customer reviews 402 of an item 208 in the electronic marketplace. In other words, the content provider 104 may determine that the user 102 often reads customer reviews, and upon detecting that the user 102 starts to view customer reviews, the clue provisioning module 244 may place the clue 404 in between consecutive customer reviews 402 for the user 102 to find.

Figure 5:
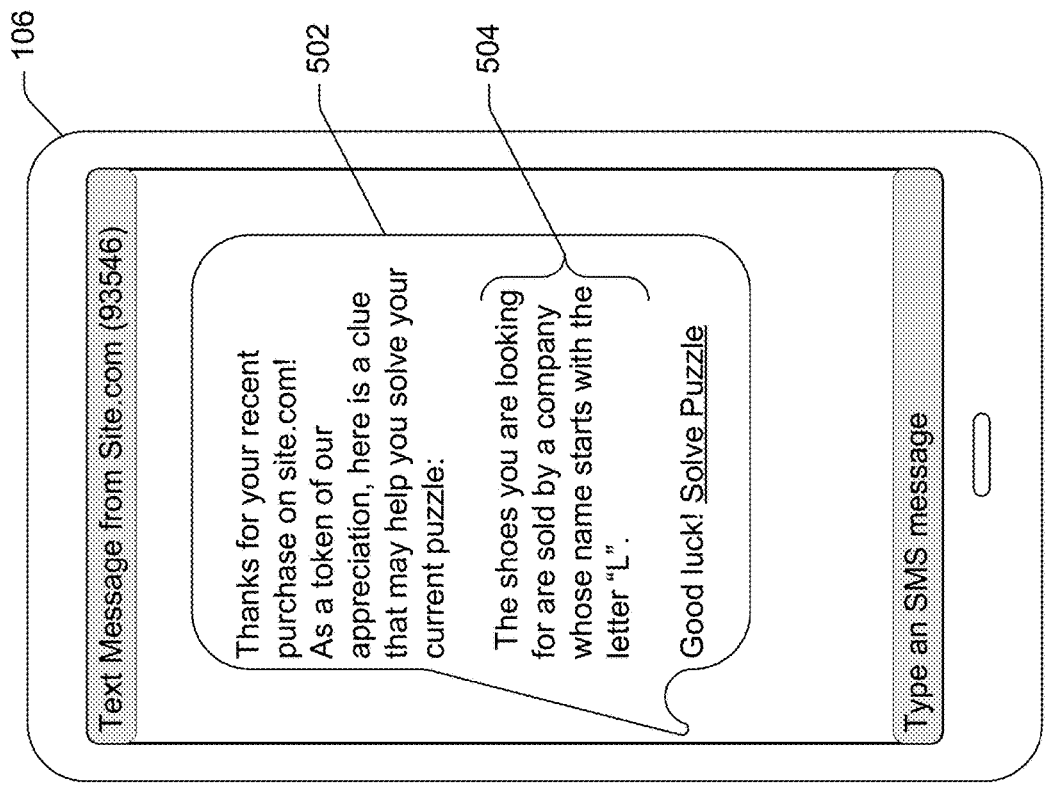
FIG. 5 illustrates an example client device of an example user, such as a user with a predilection for shoes. The client device receives, from a content provider, a text message that includes a clue designed to help the user complete an active puzzle provided to the user. The provisioning of the clue in the text message may be based on a determination that the user has just purchased an item from the content provider.

FIG. 5 shows another example where a clue 504 is provisioned via a text message 502 (e.g., SMS text) and received via the client device 106 of the user 106. Thus, the channel selector 248 can select "SMS text" as the distribution channel for the clue 504. The text message 502 also indicates that the clue 504 was provided based on a recent purchase in the electronic marketplace of the content provider 104. Thus, the trigger module 246 of the clue provisioning module 244 may have determined that the user 102 purchased an item 208 (purchasing being one example type of action with respect to the primary electronic content 207 that can be monitored for this purpose), and in response, the clue provisioning module 244 can provide the clue 504 via the text message 502. This may act as an incentive for users to interact with primary electronic content 207 (e.g., purchase items 208) of the content provider 104 in order to receive puzzle clues.

Figure 6:
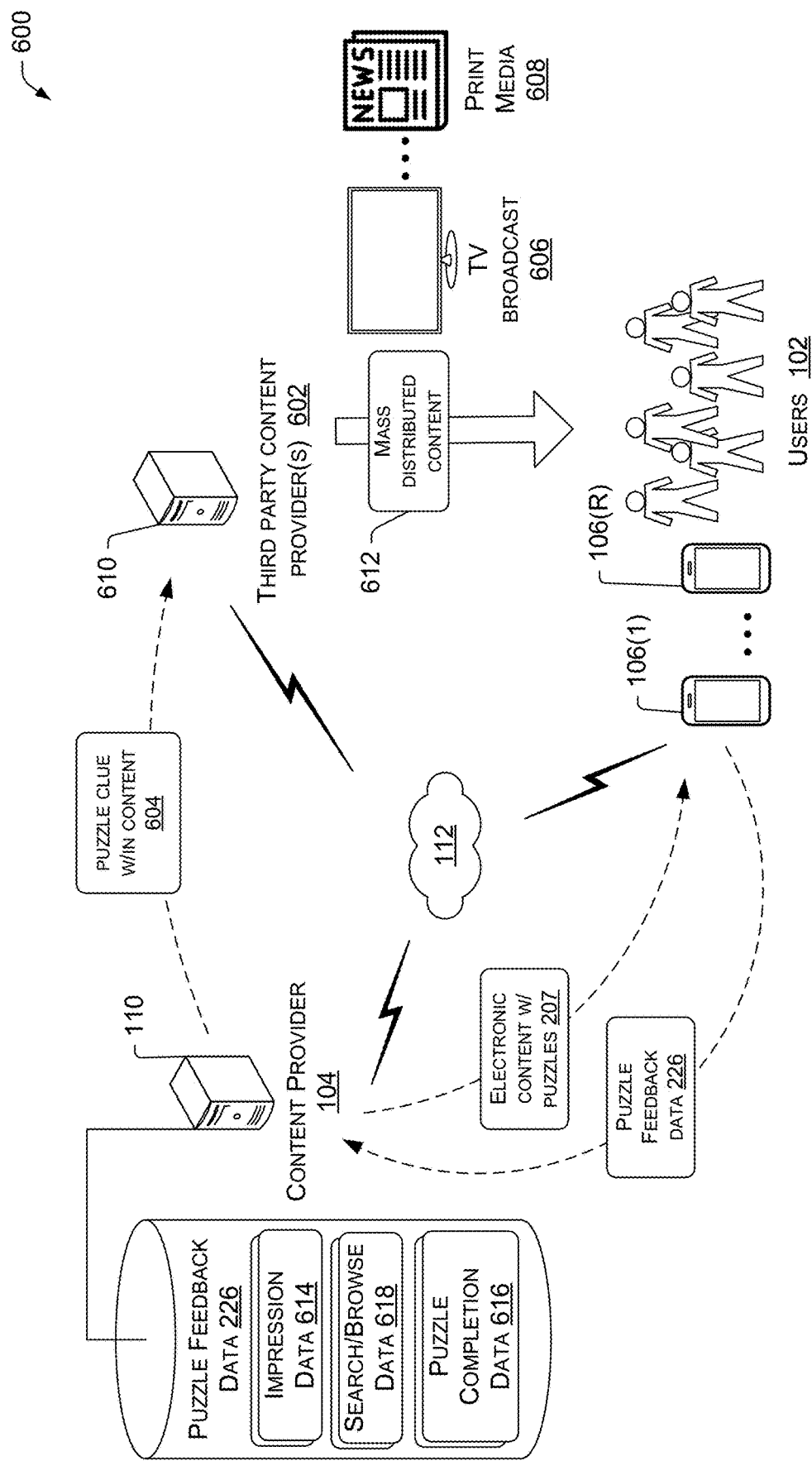
FIG. 6 illustrates an example environment in which a content provider who provisions electronic content with personalized puzzles to users also provisions clues within its own content that is distributed to a mass audience via a third party distribution channel(s). In this example, the content provider receives puzzle feedback data as users complete the puzzles, which allows the content provider to, among other things, make inferences about impression data associated with the third party, mass-distributed content.

In some implementations, the channel selector 248 of the clue provisioning module 244 may select other distributions channels for provisioning clues for other purposes. FIG. 6 illustrates an example environment 600 where the content provider 104 sends, to a third party content provider 602, content that includes a puzzle clue 604. The content with the puzzle clue 604 may be an advertisement, or any other type of content. The third party content provider 602 may represent a content provider that controls one or more distribution channels, such as a television broadcast 606 or other channels for electronic content distribution, and/or physical channels of content distribution, such as physical delivery of print media 608 (e.g., newspapers, magazines, etc.). The third party content provider(s) 602 may receive, via an associated computing device(s) 610, content from the content provider 104 when the content provider 104 wishes to have its content distributed to a mass audience in mass distributed content 612 that is distributed via a distribution channel (e.g., 606, 608) that is not controlled by the content provider 104. Providing content with puzzle clues 604 to such third party content providers 602 may be a mechanism to obtain impression data 614 associated with the content that includes the puzzle clue 604 because the users 102 who receive the mass distributed content 612 may discover the puzzle clue 604 within the mass distributed content 612, and may subsequently complete an active puzzle 108 associated with the discovered puzzle clue 604. Thus, the content provider 104 may receive puzzle completion data 616 after users 102 complete puzzles 108, and may use this puzzle completion data 616 to infer a number of impressions (e.g., views) has been made with the content provider's 104 own content distributed the a mass audience in the mass distributed content 612. For instance, if the content that includes the puzzle clue 604 is mass distributed in the mass distributed content 612, and after such distribution, forty users 102 with active puzzles 108 related to the puzzle clue 604 complete their puzzles 108 within a time period from the mass content distribution 612, the content provider 104 can infer forty impressions (e.g., views) of the content with the puzzle clue 604 in the impression data 614. Thus, even though the content provider 104 has no control over the distribution channel (e.g., 606, 608, etc.) through which their content with the puzzle clue 604 was distributed to a mass audience, the content provider 104 is nevertheless able to infer the impression data 614 with respect to its own content in the mass distributed content 612.

FIG. 6 also shows that the puzzle feedback data 226 may include search and/or browse data 618. For example, the puzzle 108 provisioned to a user 102 may task the user with searching or browsing for a particular item 208 in an electronic marketplace of the content provider 104 that serves the primary electronic content 207. When the user 102 subsequently searches and or browses for the item 208, the search and/or browse data 618 may exhibit the particular search behavior and/or browse behavior of the user 102 that was employed prior to completing the puzzle 108. This may inform the content provider 104 as to the search and/or browse techniques employed by the user 102 to find a particular item 208 (with particular attributes) in the electronic marketplace.

Returning to FIG. 2, the memory 204 of the content provider's 104 system may further store, or have access to, a puzzle/reward creation interface 250 to allow for the creation of puzzles 108 and rewards 210 that are ultimately stored in the database 206. The puzzle/reward interface 250 may be embodied in a user interface portal for authorized users (employees of the content provider 104) to create custom puzzles 108 and rewards 210 that are available to be provisioned to users. The interface 250 may additionally, or alternatively, allow for importing files and other software programs that pertain to puzzles 108.

The memory 204 may further store, or have access to, a reward provisioning module 252 for provisioning rewards 210 when one or more criteria has been satisfied for completing a puzzle 108. For example, if a user 102 solves a puzzle 108, an associated (e.g., promised, offered, etc.) reward 210 may be provisioned to the user 102. This may include associating the reward 210 with the user's account in the user data 216 so that the reward may be applied to an action taken by the user 102 with respect to the content provider 104. For example, a reward 210 may unlock content 207, such as free music and/or a free movie, for the user 102 to stream as a reward 210 for completing a puzzle 108. The reward 210 may be a discount that is applied to a next purchase during a checkout process when the user 102 is purchasing an item 208 in the electronic marketplace.

The memory 204 may further store, or have access to, a puzzle feedback data collector 254 to collect the puzzle feedback data 226, such as the examples given in FIG. 6. The memory 204 may further store, or have access to, a recommendation engine 256 for recommending items 208 to users. The recommendation engine 256 may take into account a predilection 214 of a user 102 to recommend an item 208 pertaining to that predilection 214. In some implementations, the puzzle completion data 616 may include preference data associated with users based on puzzle-completing actions taken by the users. For instance, a puzzle 108 may be a creative exercise to design a particular product (e.g., a fidget spinner) in the electronic marketplace. Based on options selected by the user 102, the personalization engine 212 may learn preferences of the user 102 for particular item 208 attributes, and may store that preference data in the puzzle feedback data 226. This preference data may be used by the recommendation engine 256 to recommend items 208 to the user 102 in the future.

The memory 204 may further store, or have access to, an inventory management module 258 for adjusting or otherwise managing a current inventory of items 208 in the electronic marketplace based on puzzle feedback data 226. For instance, the aforementioned preference data that may be obtained as a result of a user 102 completing a creative exercise in a puzzle 108 may be used to determine whether to stock more of a particular type of item 208 in a fulfillment warehouse, and/or stock less of a different type of item 208 in the fulfillment warehouse. As an example, a user 102 may be given a puzzle 108 that tasks the user 102 to select from available options to customize a product, like a fidget spinner, and the user 102 may select particular options to create a customized product. These user selections can be taken into account by the inventory management module 258 to stock more (e.g., order more) fidget spinners that are like (e.g., share attributes with) the customized fidget spinner created by the user 102, and stock less (e.g., refrain from ordering, or refrain from ordering as many) fidget spinners that do not align with custom-made fidget spinners. In some cases, this may involve stocking, and/or reorganizing, products within a fulfillment center(s), or shuffling/moving/relocating products between fulfillment centers.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 7:
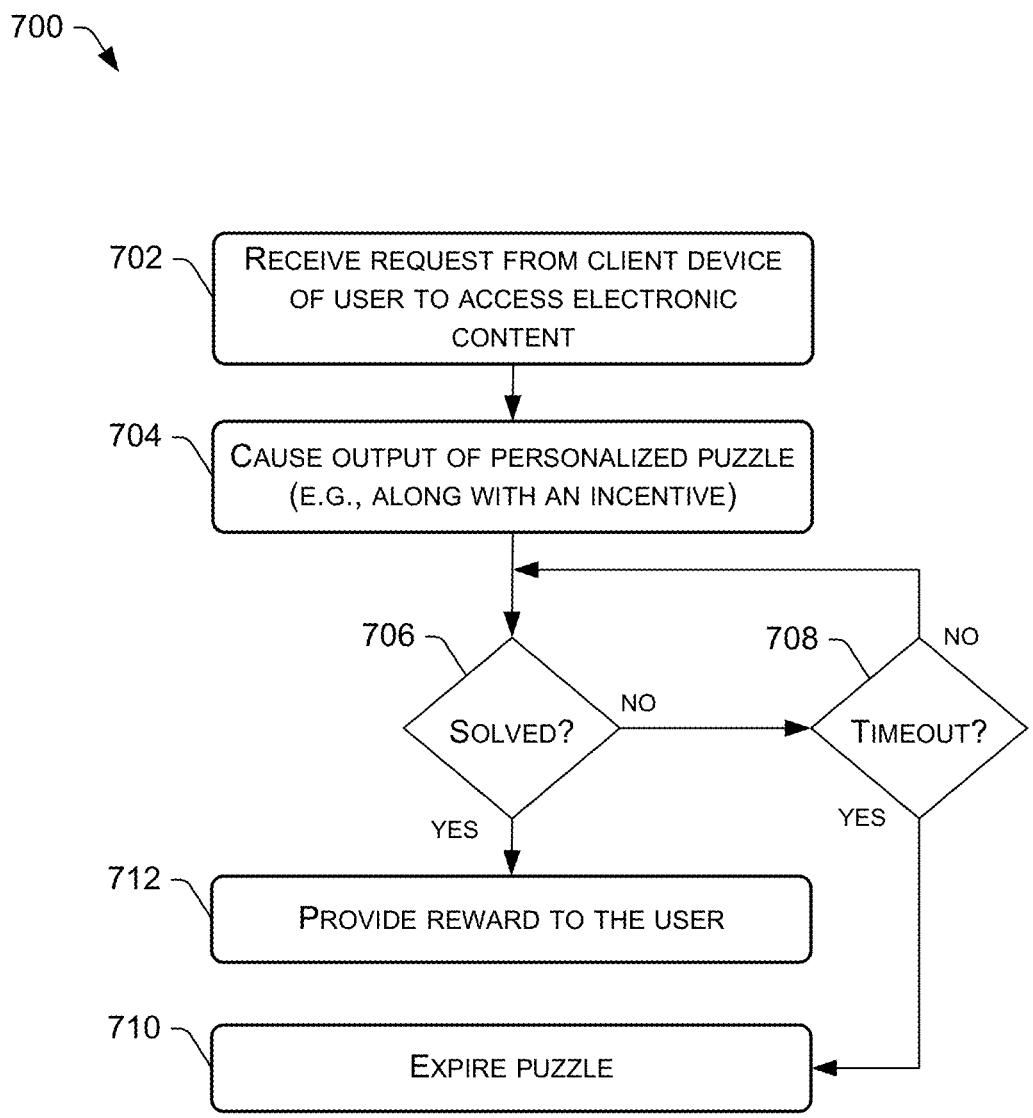
FIG. 7 illustrates a flow diagram of an example process for providing a personalized puzzle to a user who is accessing electronic content from a content provider.

FIG. 7 illustrates a flow diagram of an example process 700 for providing a personalized puzzle 108 to a user 102 who is accessing electronic content 207 from a content provider 104. For discussion purposes, the process 700 is described with reference to the previous figures, and may be implemented by the computing device(s) 110 of the content provider 104.

At 702, the computing device(s) 110 that serve electronic content 107/207 may receive a request from a client device 106 to access the electronic content 207.

At 704, the computing device(s) 110 may cause the client device 106 to output a puzzle 108 to a user 102 associated with the request. The puzzle 108 that is output at 704 may be personalized to the requesting user 102, such as by including a theme, or being a type of puzzle 108, that corresponds to a predilection 214 of the user 102. In some embodiments, the puzzle 108 may be output at 704 along with an incentive (e.g., an offer to provide a reward 210 to the user 102 in exchange for the user 102 completing the puzzle 108.

At 706, a determination may be made as to whether the puzzle 108 has been completed (e.g., solved) by the requesting user 102. This may include the computing device(s) 110 monitoring for receipt of puzzle completion data 616, from the client device 106, indicating that the user 102 has completed the puzzle 108 (e.g., by providing a correct answer to the puzzle 108, by completing a specified operation, etc.). In some implementations, the determination at 706 may include determining whether rules for completing the puzzle 108 have been complied with (e.g., completing the puzzle 108 within a prescribed time period, being the first of many users to complete the puzzle 108, etc.).

If it is determined, at block 706, that the user 102 has not completed the puzzle 108, the process 700 may follow the "no" route from block 706 to block 708, where the computing device(s) 110 may determine whether a time period has expired for completing the puzzle 108. For instance, the user 102 may be given an allotted time period to complete the puzzle 108 as one of several possible rules for completing the puzzle 108. If a timeout has not occurred at block 708, the process 700 may follow the "no" route from block 708 back to block 706 to iterate the monitoring operation at block 706 for determining whether the puzzle 108 has been completed by the user 102. Once a timeout occurs at block 708 without a positive determination at block 706 that the puzzle 108 has been completed by the user 102, the process 700 may follow the "yes" route from block 708 to block 710, whether the computing device(s) 110 may expire the puzzle 108, which makes it so the user 102 no longer has an opportunity to complete the puzzle 108. For example, after a week without completing the puzzle 108, the content provider 104 may expire the puzzle at block 710.

If, on the other hand, it is determined, at block 706, from puzzle completion data 616 received from the client device 106, that the user 102 completed (e.g., solved) the puzzle 108, the process 700 may follow the "yes" route from block 706 to block 712, where the computing device(s) 110 may provide the reward 210 to the user 102 based at least in part on the user 102 having completed the puzzle 108. For instance, the reward 210 may include unlocking content (e.g., audio and/or video content), that is normally provided (e.g., streamed) at a cost to the user 102, free of charge, or the reward 210 may be a discount on a future purchase of an item 208 from the content provider 104.

It is to be appreciated that, in response to receiving data indicating that the user 102 has completed the puzzle 108, the personalized puzzle selector 230 may select another puzzle 108, perhaps with a higher difficulty level than the first puzzle, along with another offer to provide a reward 210 for completing the additional, more difficult puzzle 108. The second reward 210 may be of greater value than the first reward 210 due to the greater difficulty of the second puzzle 108. This may iterate to maintain user engagement with the electronic content 107/207.

Figure 8:
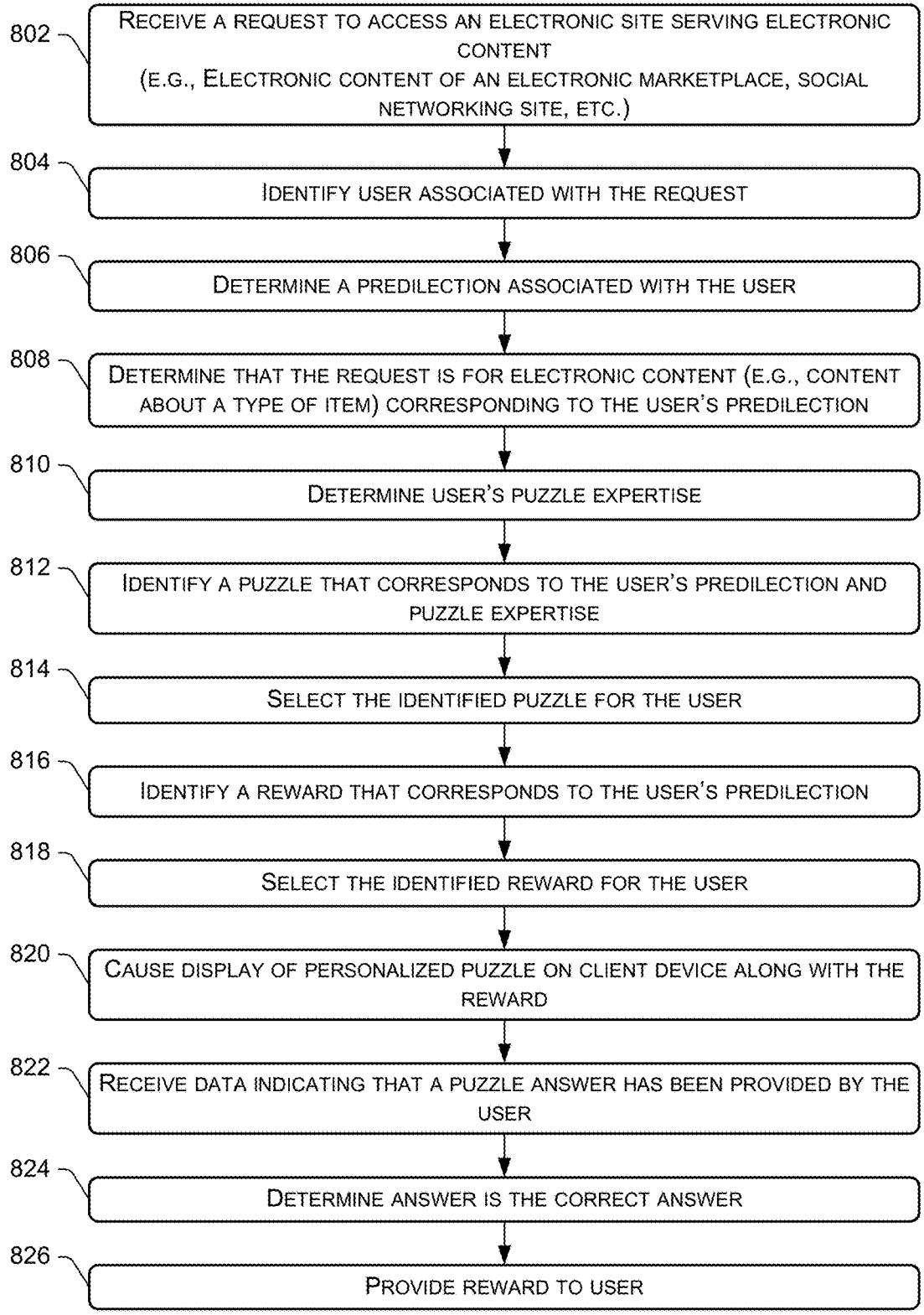
FIG. 8 illustrates a flow diagram of a more detailed example process for providing a personalized puzzle to a user who is accessing electronic content from a content provider.

FIG. 8 illustrates a flow diagram of a more detailed example process 800 for providing a personalized puzzle 108 to a user 102 who is accessing electronic content 107/207 from a content provider 104. For discussion purposes, the process 800 is described with reference to the previous figures, and may be implemented by the computing device(s) 110 of the content provider 104.

At 802, the computing device(s) 110 that hosts an electronic site serving electronic content 107/207 may receive a request from a client device 106 to access the electronic site. For example, the request received at 802 may include a request to access an ecommerce retailer site that hosts an electronic marketplace, a social networking site, or any similar type of site that provides the electronic content 107/207. The request received at 802 may also involve a general request for access to the electronic site, and/or a request to access particular electronic content 107/207 available on the electronic site.

At 804, the computing device(s) 110 may identify a user 102 associated with the request. This can be done based on credentials, biometric data, or any similar identifying data received from the client device 106, or maintained by the computing device(s) 110 in association with the client device 106.

At 806, the computing device(s) 110 may determine a predilection 214 associated with the user 102. This may be based at least in part on the predilections 214 stored in the customer data 216 in association with the user 102. For example, determining the predilection 214 of the user 102 at block 806 may be based on at least one of past purchases made by the user 102 via an electronic marketplace that serves the electronic content 107/207, past browsing behavior of the user 102 on the electronic marketplace, past search behavior of the user 102 on the electronic marketplace, or social network data 222 of the user 102. The predilection determination at block 806 may also be a real-time determination based on the user's access of electronic content 107/207 about an item 208 of a particular type. For example, if the user 102 access a shoe product, like the one shown in FIG. 1, the predilection 214 may be determined as a predilection 214 for shoes based on the user's 102 current browse behavior.

At 808, the computing device(s) 110 may determine that the request to access the electronic content 107/207 received at block 802 comprises a request to receive the electronic content 107/207 about a type of item 208, available in the electronic marketplace, that corresponds to the predilection 214 of the user 102, determined at block 806. In other words, the trigger module 240 of the puzzle provisioning module 238 may determine that a precondition for providing a puzzle 108 to the user 102 is that the user 102 is requesting electronic content 107/207 about an item 208 that is of a type corresponding to the user's 102 predilection 204.

At 810, the computing device(s) 110 may determine a level of expertise of the user 102 for completing puzzles 108. The computing device(s) 110 may use the puzzle aptitude data 214 for this determination, which may indicate a success rate or a similar metric based on past attempts made by the user 102 to complete puzzles 108 that were previously provisioned to the user 102.

At 812, the personalized puzzle selector 230 may identify a puzzle 108 that is a type of puzzle 108, or that includes a theme, corresponding to the predilection 214 associated with the user 102. This identification at block 812 may be based on puzzle mapping information 232 accessible to the computing device(s) 110, which information 232 maps user predilections 214 to puzzles 108 and puzzle difficulty levels to puzzle expertise levels. In other words, the puzzle 108 may be identified at block 812 as a puzzle that includes a theme corresponding to the user's 102 predilection 214, and that has a difficulty level that corresponds to the level of expertise of the user 102 for completing puzzles 108.

At 814, the personalized puzzle selector 230 may select the identified puzzle 108 for the client device 106 to output. Again, this may be the puzzle 108 identified as corresponding to the user's 102 predilection and the user's 102 puzzle-playing expertise.

At 816, the personalized reward selector 234 may identify a reward 210 based on the reward 210 being a type of reward 210 that corresponds to the predilection 214 of the user 102. This may be determined from reward mapping information 236 accessible to the computing device(s) 110, which information 236 maps user predilections 214 to rewards 210.

At 818, the personalized reward selector 234 may select the identified reward 210 for inclusion in the offer that is to be included with the to-be-provisioned puzzle 108.

At 820, the computing device(s) may cause the puzzle 108 to be displayed on a display of the client device 106 along with an offer to provide a reward 210 to the user 102 in exchange for the user 102 solving the puzzle 108. In some implementations, the electronic content 107/207 may be served in at least one of an electronic marketplace or a social networking site, and the client device 106 may, at block 820, output the electronic site with the primary electronic content 107/207 along with the puzzle 108 and possibly with rules for solving the puzzle 108. As mentioned, the puzzle 108 can, in some instances, be provisioned in content that is personalized to the user 102 in question, such as by presenting the puzzle 108 before, during, or after a recommended video clip, within recommended items 208, and/or on a site that is somehow associated with the user 102 (e.g., a site frequently visited/accessed by the user 102, a site with content associated with the user's 102 predilection(s) 214, etc.).

At 822, the computing device(s) 110 may receive, from the client device 106, data indicating an answer provided by the user 102 in an attempt to solve the puzzle 108.

At 824, the computing device(s) 110 may determine that the user 102 solved the puzzle 108 based at least in part on the answer provided by the user 102 corresponding to a correct answer for solving the puzzle 108.

At 826, the reward provisioning module 252 may provide the reward 210 to the user 102 based at least in part on the determining that the user 102 solved the puzzle 108.

Figure 9:
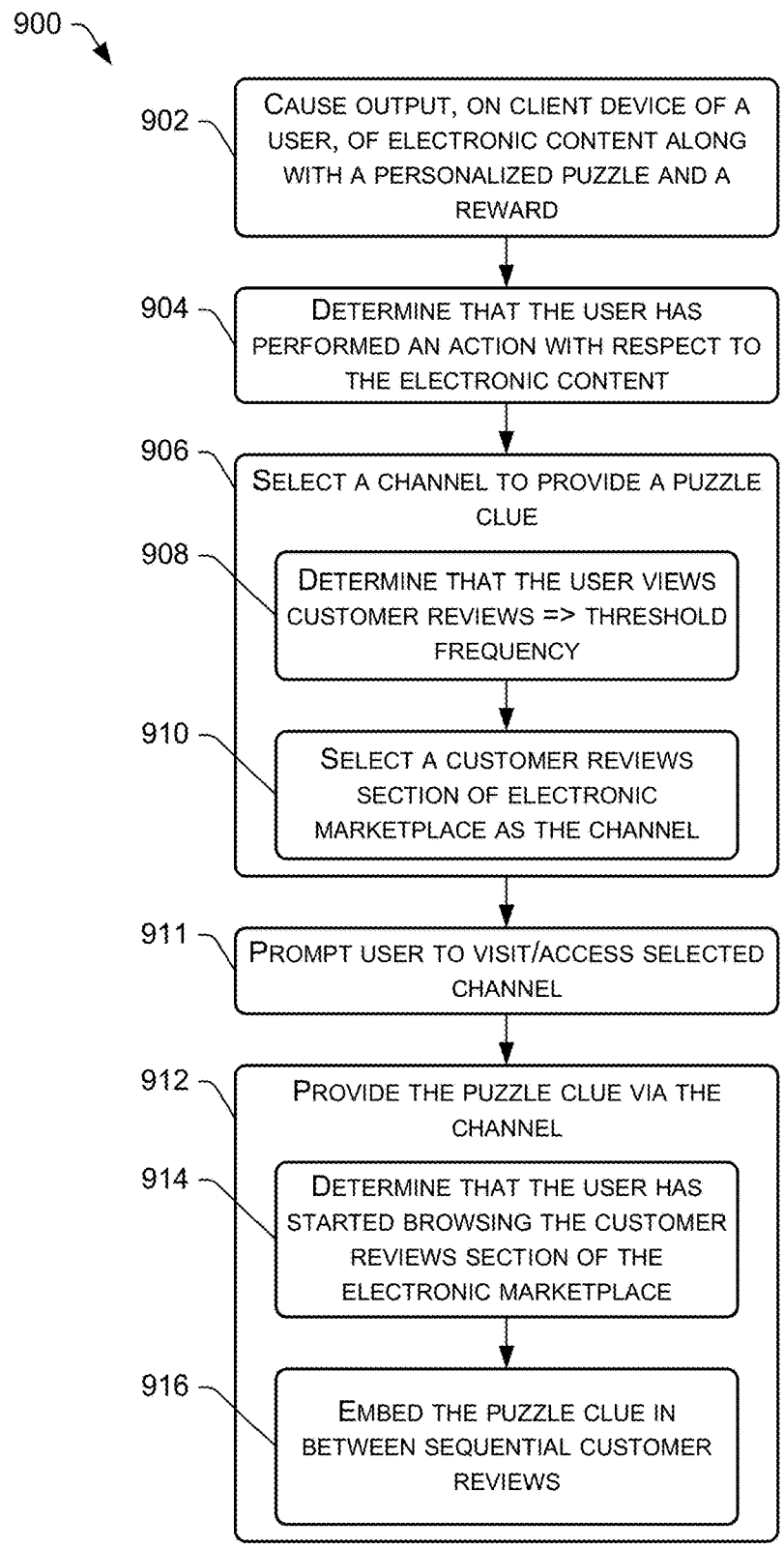
FIG. 9 illustrates a flow diagram of an example process for providing a puzzle clue designed to help a user complete an active puzzle.

FIG. 9 illustrates a flow diagram of an example process 900 for providing a puzzle clue designed to help a user 102 complete an active puzzle 108. For discussion purposes, the process 900 is described with reference to the previous figures, and may be implemented by the computing device(s) 110 of the content provider 104.

At 902, the computing device(s) 110 of the content provider 104 may cause a client device 106 of a user 102 to output electronic content 107/207 along with a puzzle 108 that is personalized to the user 102, and a reward 210 for completing the puzzle 108. The operation(s) at block 902 may be similar to those performed at block 704 of the process 700 and/or those performed at block 820 of the process 800.

At 904, the trigger module 246 of the clue provisioning module 244 may determine that the user 102 has performed an action with respect to the electronic content 107/207. For instance, when the electronic content 107/207 is served in an electronic marketplace, and the action may include at least one of adding an item 208 to a cart in the electronic marketplace, adding the item 208 to a wish list in the electronic marketplace, or purchasing the item 208 in the electronic marketplace, to name a few possible actions.

At 906, the channel selector 248 of the clue provisioning module 244 may select a channel via which a puzzle clue is to be provided. For instance, the puzzle clue may be provided in the electronic content 107/207 itself (e.g., on an item detail page of primary electronic content 107/207 about an item 208, in an email message, in a SMS text message, in video or audio content provided via the content provider's 104 own distribution channel, or in content printed on a physical medium (e.g., print media). As mentioned, the puzzle clue may be provisioned in, or by leveraging, content that is personalized to the user 102 in question. For example, a recommended video clip suggested to the user 102 may include a puzzle clue. Any type of personalized content may include a puzzle clue in this manner.

FIG. 9 shows an example where the selection of the distribution channel at block 906 may include, at 908, determining, from past browsing behavior of the user 102 on an electronic marketplace that serves the electronic content 107/207, that the user 102 views customer reviews of items 208 in the electronic marketplace at a frequency that meets or exceeds a threshold frequency, and, at 910, selecting a customer reviews section of the electronic marketplace as the distribution channel based on the notion that the user 102 is likely to view customer reviews sometime soon, and when he/she does, he/she will see a puzzle clue in the customer reviews.

At 911, the clue provisioning module 244 may prompt the user 102 (e.g., via the user's 102 client device 106) to access the channel that was selected at 906 for provisioning the puzzle clue. For example, the user 102 may be prompted (e.g., via a text message, an email, etc.) to visit/access a customer review section of an electronic marketplace for a particular item 208 (or a particular type of item 208) to find a puzzle clue to his/her active puzzle 108. In some embodiments, the trigger module 246 of the clue provisioning module 244 may monitor whether the user 102 has accessed the selected channel, and if the user 102 has not accessed the selected channel after a predetermined period of time (e.g., a timeout period), the clue provisioning module 244 may issue the prompt at block 911. Alternatively, the user 102 may not be prompted by omitting block 911 from the process 900, in which case, the user 102 may be left to discover the puzzle clue on his/her own, without a prompt or other information to tell the user 102 where to locate the puzzle clue.

At 912, the clue provisioning module 244 may provide the puzzle clue to the user 102 via the distribution channel selected at block 906. When the operations at blocks 908 and 910 are performed in the process 900, the provisioning of the clue at block 912 may include, at block 914, determining that a request to access electronic content 107/207 of the content provider 104 includes a browse request to view one or more customer reviews 402 of an item 208 in the electronic marketplace, and, at block 916, embedding, within the customer reviews of the item 208, the puzzle clue that is designed to help the user complete the puzzle 108. An example of this technique is shown in FIG. 4.

It is to be appreciated that the provisioning of the puzzle clue at block 912 may be in response to the determining that the user has performed the action with respect to the electronic content 107/207 at block 904, or in response to some other trigger (e.g., a time interval when clues are periodically provisioned, some other event, etc.).

Figure 10:
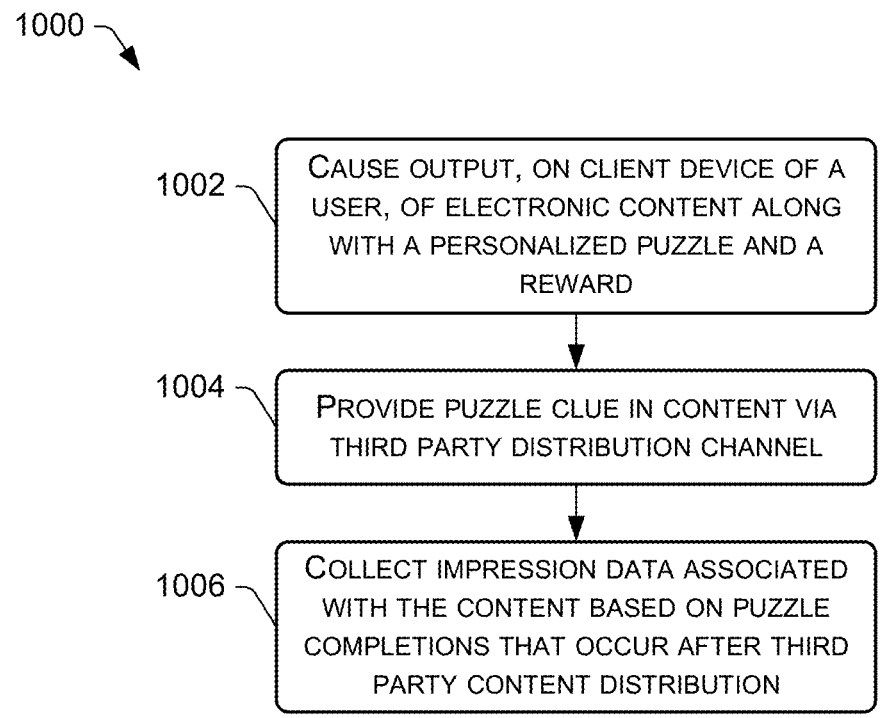
FIG. 10 illustrates a flow diagram of an example process for collecting impression data of third party distributed content using puzzle clues.

FIG. 10 illustrates a flow diagram of an example process 1000 for collecting impression data of third party distributed content using puzzle clues. For discussion purposes, the process 1000 is described with reference to the previous figures, and may be implemented by the computing device(s) 110 of the content provider 104.

At 1002, the computing device(s) 110 of the content provider 104 may cause a client device 106 of a user 102 to output electronic content 107/207 along with a puzzle 108 that is personalized to the user 102, and a reward 210 for completing the puzzle 108. The operation(s) at block 1002 may be similar to those performed at block 704 of the process 700, those performed at block 820 of the process 800, and/or those performed at block 902 of the process 900.

At 1004, the content provider 104 that owns the electronic content 107/207 may provide a puzzle clue within content that is created by the content provider 104 and distributed to a mass audience via a distribution channel that is not controlled by the content provider 104. In some implementations, the distribution channel may include a television broadcast 606, a social networking site, or print media 608.

At 1006, the puzzle feedback data collector 254 may collect impression data 614 associated with the content that contains the puzzle clue based at least in part on receiving data indicating that users have completed the puzzle 108 relating to the puzzle clue, wherein the receiving of the data occurs after the content is distributed to the mass audience via the distribution channel at block 1004.

Figure 11:
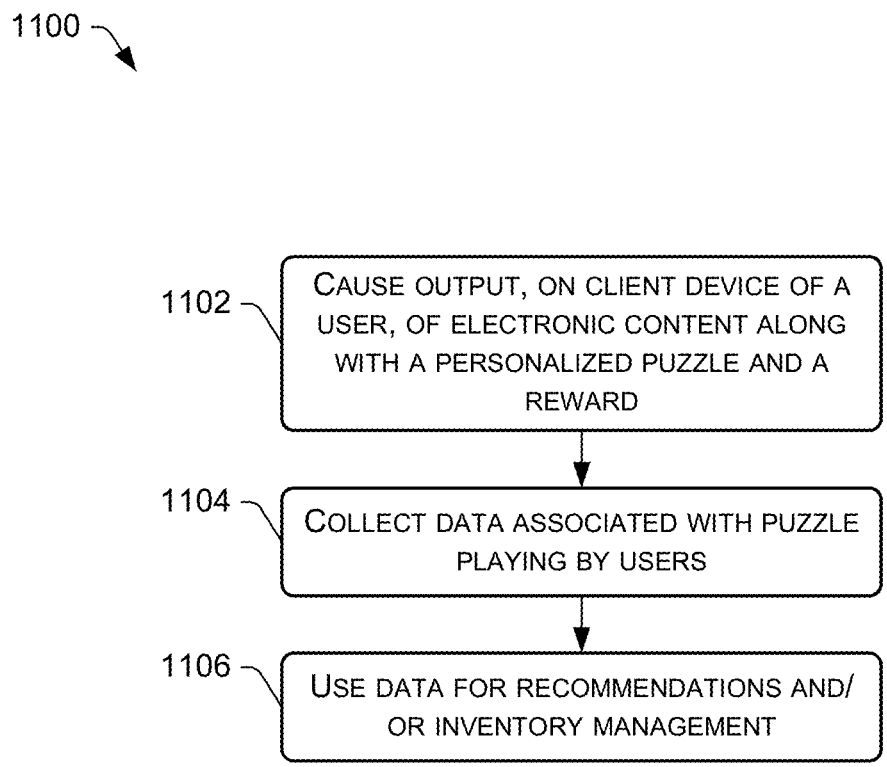
FIG. 11 illustrates a flow diagram of an example process for collecting puzzle feedback data from a user in the process of playing a puzzle, and using the collected data for item recommendations and/or inventory management.

FIG. 11 illustrates a flow diagram of an example process 1100 for collecting puzzle feedback data 226 from a user 102 in the process of playing a puzzle 108, and using the collected data for item recommendations and/or inventory management. For discussion purposes, the process 1100 is described with reference to the previous figures, and may be implemented by the computing device(s) 110 of the content provider 104.

At 1102, the computing device(s) 110 of the content provider 104 may cause a client device 106 of a user 102 to output electronic content 107/207 along with a puzzle 108 that is personalized to the user 102, and a reward 210 for completing the puzzle 108. The operation(s) at block 1102 may be similar to those performed at block 704 of the process 700, those performed at block 820 of the process 800, those performed at block 902 of the process 900, or those performed at block 1002 of the process 1000.

At 1104, the puzzle feedback data collector 254 may collect puzzle feedback data 226 based on the user 102 playing the puzzle 108, and possibly completing the puzzle 108. In an example, when the puzzle 108 tasks the user 102 with searching or browsing for an item 208 available in an electronic marketplace that serves the electronic content 107/207, the data collected at 1104 may include search data or browse data associated with the user 102 based at least in part search behavior or browse behavior of the user 102 during puzzle play, and/or leading up to completion of the puzzle 108. In another example, when the puzzle 108 tasks the user 108 with creating a customized product from available options provided within an electronic marketplace that serves the electronic content 107/207, the data collected at 1104 may include preference data associated with the user 102 based at least in part on individual ones of the options selected by the user 102 during puzzle play, and/or leading up to completion of the puzzle 108.

At 1106, the data may be used by the recommendation engine 256 to recommend one or more items 208 to the user 102, and/or by the inventory management module 258 to adjust inventory of items 208 available in the electronic marketplace. For instance, preference data associated with the user 102 that is collected at block 1104 may be used to suggest recommended products to the user 102 during future browsing sessions, and/or to adjust inventory of items 208 available via the electronic marketplace. In some cases, adjusting item inventory may involve stocking, and/or reorganizing, products within a fulfillment center(s), or shuffling/moving/relocating products between fulfillment centers The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

We claim:

1. A computer-implemented method comprising:
   receiving, by a server computer that hosts an electronic site for serving electronic content about an item in an electronic marketplace, a request from a client device to receive the electronic content about the item available in the electronic marketplace;
   identifying, by the server computer, a user associated with the request based at least in part on credentials received from the client device;
   determining, by the server computer, a predilection associated with the user based at least in part on user data accessible to the server computer;
   identifying, by the server computer, a puzzle that is a type of puzzle corresponding to the predilection associated with the user, the puzzle being identified based at least in part on puzzle mapping information that is accessible to the server computer and that maps user predilections to puzzles;
   sending, by the server computer and to the client device, the electronic content about the item and instructions that cause the client device to display an item detail page via a display of the client device, the item detail page presenting the electronic content about the item along with a pop-up window that presents: (i) the puzzle, (ii) rules for solving the puzzle, and (iii) an offer to provide a reward to the user in exchange for the user solving the puzzle in compliance with the rules;
   after the sending to the client device the electronic content about the item and the instructions, determining that the user has performed an action with respect to the electronic content, wherein the action includes at least one of adding the item to a cart in the electronic marketplace, adding the item to a list in the electronic marketplace, or purchasing the item in the electronic marketplace;
   providing a clue to the user in response to the determining that the user has performed the action, wherein the clue is designed to help the user complete the puzzle;
   receiving, by the server computer and from the client device, data via a field presented in the pop-up window, the data indicating an answer provided by the user in an attempt to solve the puzzle;
   determining, by the server computer, that the user solved the puzzle based at least in part on the answer provided by the user corresponding to a correct answer for solving the puzzle; and
   providing, by the server computer, the reward to the user based at least in part on the determining that the user solved the puzzle.

2. The computer-implemented method of claim 1, wherein:
   the determining of the predilection occurs in real-time based at least in part on a type of the item.

3. The computer-implemented method of claim 1, wherein the puzzle is a first puzzle having a first difficulty level, and wherein the reward is a first reward having a first value, the computer-implemented method further comprising:
   in response to the receiving of the data indicating that the user has completed the first puzzle, causing the client device to display (i) a second puzzle having a second difficulty level higher than the first difficulty level and (ii) a second offer to provide a second reward having a second value greater than the first value to the user in exchange for the user completing the second puzzle,
   wherein the second puzzle is the type, or a different type, of puzzle that corresponds to the predilection, or a different predilection, of the user.

4. A computer-implemented method comprising:
   receiving, by one or more computing devices that serve electronic content in an electronic marketplace, a request from a client device to access a portion of the electronic content about an item available in the electronic marketplace;

determining that the portion of the electronic content corresponds to a predilection of a user associated with the request;

in response to the determining that the portion of the electronic content corresponds to the predilection of the user, sending, by the one or more computing devices and to the client device, the portion of the electronic content about the item and instructions that cause the client device to display an item detail page via a display of the client device, the item detail page presenting the portion of the electronic content and a pop-up window that presents a puzzle along with an offer to provide a reward to the user in exchange for completing the puzzle, wherein the puzzle includes a theme, or is a type of puzzle, that corresponds to the predilection of the user;

after the sending to the client device the portion of the electronic content about the item and the instructions, determining that the user has performed an action with respect to the portion of the electronic content, wherein the action includes at least one of adding the item to a cart in the electronic marketplace, adding the item to a list in the electronic marketplace, or purchasing the item in the electronic marketplace;

providing a clue to the user in response to the determining that the user has performed the action, wherein the clue is designed to help the user complete the puzzle;

receiving, by the one or more computing devices and from the client device, data via a field presented in the pop-up window indicating that the user has completed the puzzle; and providing, by the one or more computing devices, the reward to the user based at least in part on the user having completed the puzzle.

5. The computer-implemented method of claim 4, further comprising determining the predilection of the user based at least in part on at least one of past purchases made by the user via the electronic marketplace that serves the electronic content, past browsing behavior of the user on the electronic marketplace, past search behavior of the user on the electronic marketplace, or social network data of the user.

6. The computer-implemented method of claim 4, wherein:

the determining that the portion of the electronic content corresponds to the predilection of the user comprises determining that a type of the item corresponds to the predilection of the user.

7. The computer-implemented method of claim 4, further comprising:

determining a level of expertise of the user for completing puzzles, wherein the level of expertise of the user is determined based at least in part on past attempts made by the user to complete puzzles previously provisioned to the user; and selecting the puzzle based at least in part on the puzzle having a difficulty level that corresponds to the level of expertise of the user.

8. The computer-implemented method of claim 4, wherein the providing the clue to the user comprises providing the clue in at least one of the portion of the electronic content, an electronic mail (email) message, a Short Message Service (SMS) text message, video or audio content provided via a distribution channel that is controlled by a service provider that provides the electronic content, or content printed on a physical medium.

9. The computer-implemented method of claim 4, further comprising:

providing the clue within content that is (i) created by a content provider that provided the electronic content and (ii) distributed to an audience via a distribution channel that is controlled by an entity other than the content provider; and collecting impression data associated with the content based at least in part on the receiving of the data indicating that the user has completed the puzzle and further based at least in part on additional data indicating that one or more other users have completed the puzzle, wherein the receiving of the data occurs after the content is distributed to the audience via the distribution channel.

10. The computer-implemented method of claim 9, wherein the distribution channel comprises at least one of a television broadcast, a social networking site, or print media.

11. The computer-implemented method of claim 4, wherein the puzzle tasks the user with searching or browsing for an additional item available in the electronic marketplace that serves the electronic content, further comprising collecting search data or browse data associated with the user based at least in part on search behavior or browse behavior of the user prior to the receiving of the data indicating that the user has completed the puzzle.

12. A system comprising:

one or more processors; and memory storing computer-executable instructions that, when executed on the one or more processors, cause one or more computing devices to:

receive a request from a client device to access a portion of electronic content served by the one or more computing devices, wherein the portion of the electronic content is about an item available in an electronic marketplace, and wherein the electronic content is served in the electronic marketplace;

determine that the portion of the electronic content corresponds to a predilection of a user associated with the request;

in response to determining that the portion of the electronic content corresponds to the predilection of the user:

select a puzzle that includes a theme, or is a type of puzzle, that corresponds to the predilection of the user; and send, to the client device, the portion of the electronic content about the item and instructions that cause the client device to present, on a display of the client device, a pop-up window overlaying an item detail page, the pop-up window including the puzzle along with an offer to provide a reward to the user in exchange for completing the puzzle;

after sending to the client device the portion of the electronic content about the item and the instructions, determine that the user has performed an action with respect to the portion of the electronic content, wherein the action includes at least one of adding the item to a cart in the electronic marketplace, adding the item to a list in the electronic marketplace, or purchasing the item in the electronic marketplace;

provide a clue to the user in response to determining that the user has performed the action, wherein the clue is designed to help the user complete the puzzle;

receive, from the client device, data via a field presented in the pop-up window indicating that the user has completed the puzzle; and provide the reward to the user based at least in part on the user having completed the puzzle.

13. The system of claim 12, wherein the puzzle tasks the user with creating a customized product from available options provided within the electronic marketplace that serves the electronic content, the computer-executable instructions, when executed on the one or more processors, further causing the one or more computing devices to collect preference data associated with the user based at least in part on individual ones of the options selected by the user prior to receipt of the data indicating that the user has completed the puzzle.

14. The system of claim 13, the computer-executable instructions, when executed on the one or more processors, further causing the one or more computing devices to use the preference data associated with the user to at least one of suggest recommended products to the user during future browsing sessions, or adjust inventory available via the electronic marketplace.

15. The system of claim 12, the computer-executable instructions, when executed on the one or more processors, further causing the one or more computing devices to:

determine, from past browsing behavior of the user on the electronic marketplace that serves the electronic content, that the user views customer reviews of items in the electronic marketplace at a frequency that meets or exceeds a threshold frequency;

receive a second request to access a second portion of the electronic content, wherein the second request includes a browse request to view customer reviews of the item, or a different item, in the electronic marketplace; and based at least in part on the determining that the user views the customer reviews at the frequency, embed the clue within at least one customer review of the item, or the different item.

16. The system of claim 12, wherein the puzzle at least one of: (i) tasks the user with finding an additional item available in the electronic marketplace that serves the electronic content, or (ii) provides the clue based at least in part on a past purchase made by the user via the electronic marketplace.

17. The system of claim 12, the computer-executable instructions, when executed on the one or more processors, further causing the one or more computing devices to:

determine, from reward mapping information accessible to the one or more computing devices that maps user predilections to rewards, that the reward is a type of reward that corresponds to the predilection of the user; and select the reward for inclusion in the offer.

18. The system of claim 12, wherein the electronic content is served in at least one of the electronic marketplace or a social networking site, and wherein the instructions sent to the client device further cause the client device to present the electronic marketplace or the social networking site on the display of the client device along with the puzzle.

19. The computer-implemented method of claim 4, wherein the puzzle tasks the user with creating a customized product from available options provided within the electronic marketplace that serves the electronic content, further comprising collecting preference data associated with the user based at least in part on individual ones of the options selected by the user prior to receipt of the data indicating that the user has completed the puzzle.

20. The computer-implemented method of claim 4, wherein the puzzle tasks the user with finding an additional item available in the electronic marketplace.

* * * * *